United States Patent
Taherzadeh Boroujeni et al.

(10) Patent No.: US 12,213,129 B2
(45) Date of Patent: Jan. 28, 2025

(54) PHYSICAL UPLINK SHARED CHANNEL TRANSMISSIONS

(71) Applicant: InterDigital Patent Holdings, Inc., Wilmington, DE (US)

(72) Inventors: Mahmoud Taherzadeh Boroujeni, San Diego, CA (US); Oghenekome Oteri, San Diego, CA (US); Shahrokh Nayeb Nazar, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 421 days.

(21) Appl. No.: 17/429,826

(22) PCT Filed: Feb. 10, 2020

(86) PCT No.: PCT/US2020/017481
§ 371 (c)(1),
(2) Date: Aug. 10, 2021

(87) PCT Pub. No.: WO2020/167650
PCT Pub. Date: Aug. 20, 2020

(65) Prior Publication Data
US 2022/0132533 A1 Apr. 28, 2022

Related U.S. Application Data

(60) Provisional application No. 62/908,777, filed on Oct. 1, 2019, provisional application No. 62/885,966, filed (Continued)

(51) Int. Cl.
*H04W 72/1268* (2023.01)
*H04W 72/23* (2023.01)

(52) U.S. Cl.
CPC ....... *H04W 72/1268* (2013.01); *H04W 72/23* (2023.01)

(58) Field of Classification Search
CPC ............. H04W 72/1268; H04W 72/23; H04W 72/0446; H04W 72/569; H04L 5/0044;
(Continued)

(56) References Cited

U.S. PATENT DOCUMENTS

2012/0287848 A1  11/2012  Kim et al.
2018/0049165 A1   2/2018  Byun et al.
(Continued)

FOREIGN PATENT DOCUMENTS

CN    102726109 A    10/2012
CN    107432020 A    12/2017
(Continued)

OTHER PUBLICATIONS

Huawei PUSCH enhancements for URLLC R1-1900046 Jan. 2019 (Year: 2019).*
(Continued)

*Primary Examiner* — Rina C Pancholi
(74) *Attorney, Agent, or Firm* — Condo Roccia Koptiw LLP

(57) ABSTRACT

A WTRU may receive a slot format configuration (SFC) that indicates flexible symbols, uplink symbols, and downlink symbols. The WTRU may receive an uplink grant that is associated with the PUSCH transmission with repetitions. The received uplink grant may comprise a dedicated slot format indicator (SFI) and a resource map that indicates available resource block groups associated with the uplink symbols. The WTRU may identify an available uplink symbol based on the SFC, the SFI, and the resource map. The WTRU may identify, for the available uplink symbol, unavailable resource block groups based on the resource map. The WTRU may perform a PUSCH transmission
(Continued)

repetition using the available uplink symbol, wherein the PUSCH transmission avoids the unavailable resource block groups.

20 Claims, 13 Drawing Sheets

Related U.S. Application Data on Aug. 13, 2019, provisional application No. 62/805,046, filed on Feb. 13, 2019.

(58) Field of Classification Search
CPC ... H04L 5/0092; H04L 5/0094; H04L 5/1469; H04L 1/08; H04L 5/0064; H04B 7/2656
See application file for complete search history.

(56) References Cited

U.S. PATENT DOCUMENTS

| | | | |
|---|---|---|---|
| 2018/0310333 A1 | 10/2018 | Akkarakaran et al. | |
| 2018/0367289 A1* | 12/2018 | Kim | H04L 5/0092 |
| 2019/0245648 A1 | 8/2019 | Jo et al. | |
| 2019/0342944 A1* | 11/2019 | Chatterjee | H04W 80/08 |

FOREIGN PATENT DOCUMENTS

| | | |
|---|---|---|
| KR | 10-2019-0010887 A | 1/2019 |
| WO | 2018175578 A1 | 9/2018 |
| WO | 2019/028276 A1 | 2/2019 |

OTHER PUBLICATIONS

3rd Generation Partnership Project (3GPP), R1-1091398, "Summary of Offline Discussion on 7.2.6.1.3 Potential Enhancements for PUSCH for NR URLLC", Nokia.
3rd Generation Partnership Project (3GPP), R1-1900046, "PUSCH Enhancements for URLLC", Huawei, HiSilicon, 3GPP TSG RAN WG1 Ad-Hoc Meeting 1901, Taipei, Jan. 21-25, 2019, 11 pages.
3rd Generation Partnership Project (3GPP), R1-1900929, "On PUSCH Enhancements for NR URLLC", Nokia, Nokia Shanghai Bell, 3GPP TSG RAN WG1 Ad-Hoc Meeting 1901, Taipei, Taiwan, Jan. 21-25, 2019, 13 pages.
3rd Generation Partnership Project (3GPP), TS 38.211 V0.0.0, "Technical Specification Group Radio Access Network, NR, Physical Channels and Modulation (Release 15)", May 2017, pp. 1-10.
3rd Generation Partnership Project (3GPP), TS 38.213 V0.0.1, "Technical Specification Group Radio Access Network, NR, Physical Layer Procedures for Control (Release 15)", Jul. 2017, 14 pages.
3rd Generation Partnership Project (3GPP), R1-1902608, "On potential PUSCH enhancements for URLLC", InterDigital Inc., 3GPP TSG RAN WG1 #96, Athens, Greece, Feb. 25-Mar. 1, 2019, 7 pages.
3rd Generation Partnership Project (3GPP), R1-1904884, "On PUSCH enhancements for URLLC", InterDigital Inc., 3GPP TSG RAN WG1 #96bis, Xi'an, China, Apr. 8-12, 2019, 4 pages.
3rd Generation Partnership Project (3GPP), R1-1907109, "On PUSCH Enhancements for eURLLC", InterDigital Inc., 3GPP TSG RAN WG1 #97, Reno, USA, Apr. 13-17, 2019, 4 pages.
3rd Generation Partnership Project (3GPP), R1-1909452, "PUSCH Enhancements for eURLLC", InterDigital Inc., 3GPP TSG RAN WG1 #98, Prague Czech, Aug. 26-30, 2019, 4 pages.
3rd Generation Partnership Project (3GPP), R1-1911297, "PUSCH Enhancements for eURLLC", InterDigital Inc., 3GPP TSG RAN WG1 #98bis, Chongqing, China., Oct. 14-20, 2019, 7 pages.
3rd Generation Partnership Project (3GPP), R1-1912733, "PUSCH Enhancements for eURLLC", InterDigital, Inc., 3GPP TSG RAN WG1 #99, Reno, USA, Nov. 18-22, 2019, 6 pages.

* cited by examiner

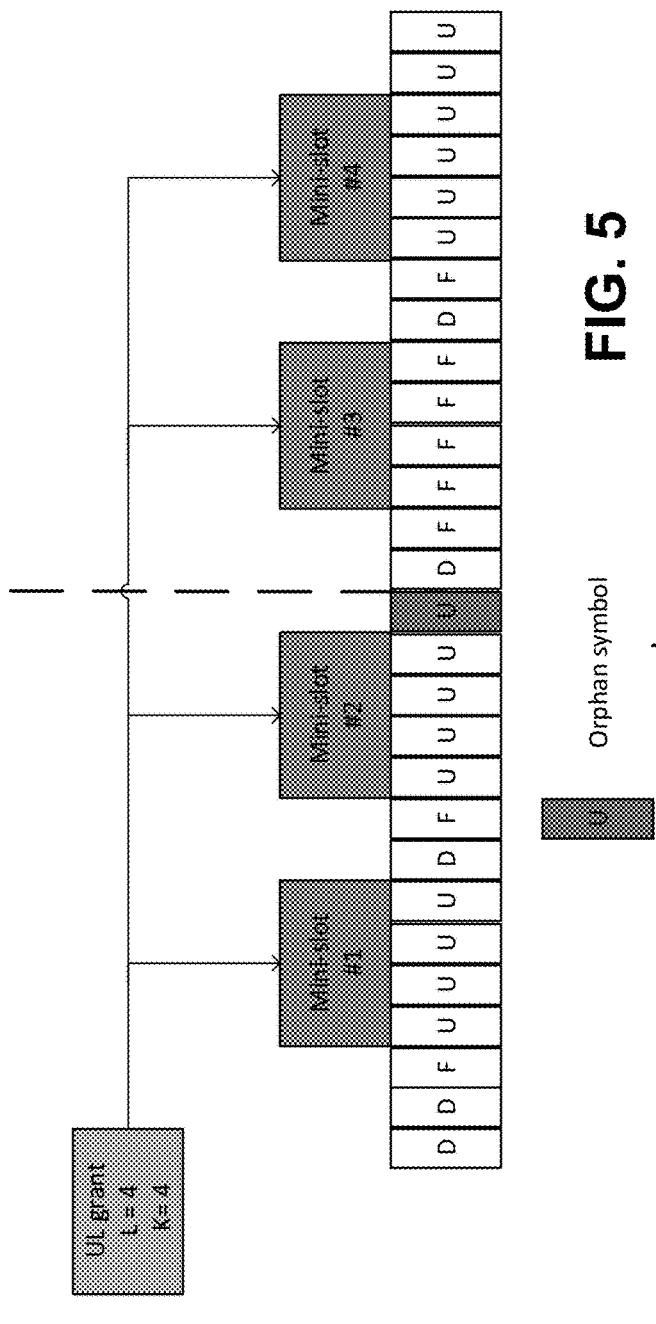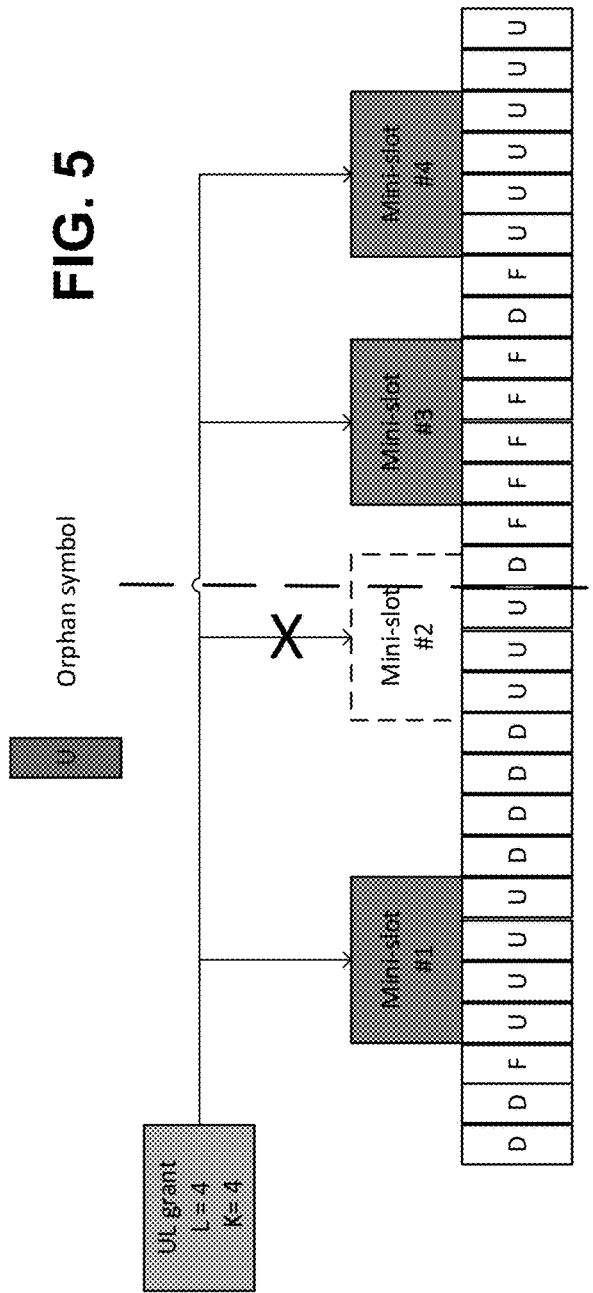

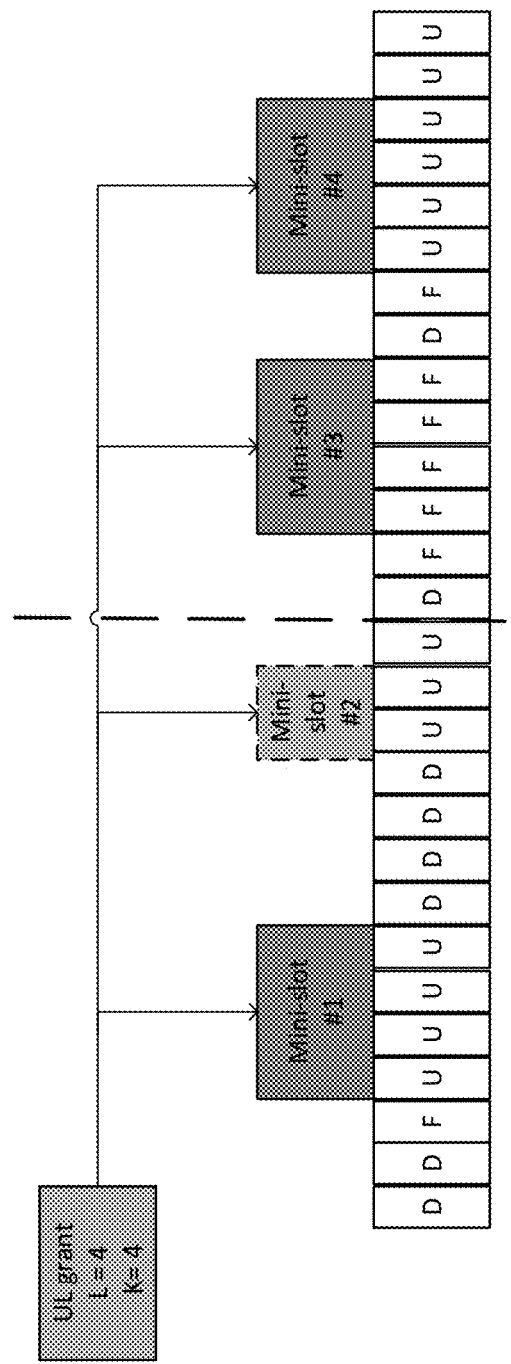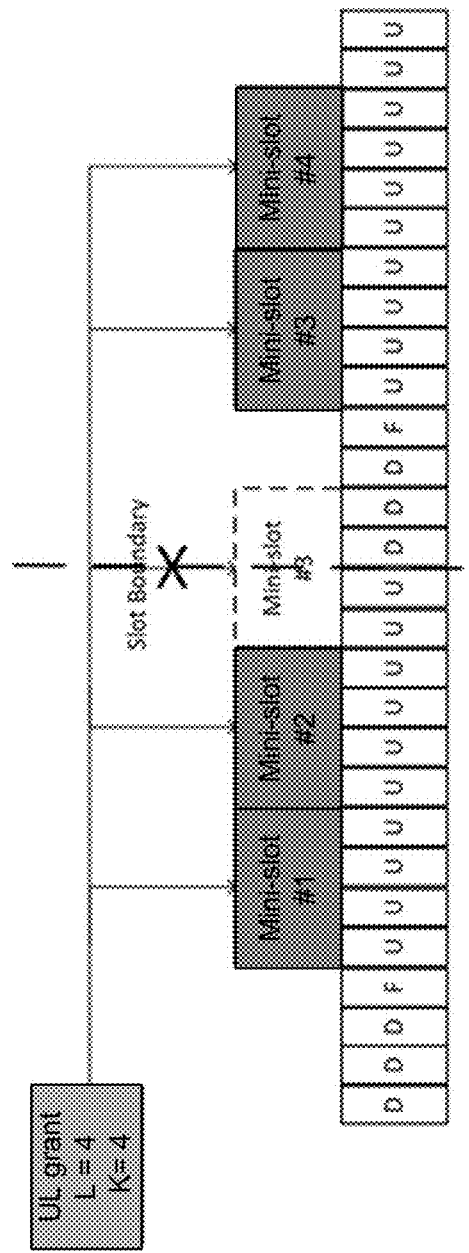

PHYSICAL UPLINK SHARED CHANNEL TRANSMISSIONS

CROSS-REFERENCE TO RELATED APPLICATIONS

This application is the National Stage Entry under 35 U.S.C. § 371 of Patent Cooperation Treaty Application No. PCT/US2020/017481, filed Feb. 10, 2020, which claims the benefit of U.S. Provisional Application No. 62/908,777, filed Oct. 1, 2019, and titled Physical Uplink Shared Channel Transmissions, U.S. Provisional Patent Application No. 62/885,966, filed Aug. 13, 3019, and titled Physical Uplink Shared Channel Transmissions, and U.S. Provisional Patent Application No. 62/805,046, filed Feb. 13, 2019, and titled Physical Uplink Shared Channel Transmissions, the contents of all of which are hereby incorporated herein by reference in their entireties.

BACKGROUND

In wireless communication systems such as, for example, NR for 5G, physical channels are defined for transporting data and control information to and from Wireless Transmit and Receive Units (WTRUs). The Physical Uplink Shared Channel (PUSCH) may be used to transmit uplink data from a WTRU.

In the time domain, wireless transmissions may be organized into frames, which may be divided into ten equal subframes. Each subframe may include two equal slots, and each slot may consist of a number of orthogonal frequency division multiplexing (OFMD) symbols. One subcarrier during one OFDM symbol may be referred to as a resource element. The resource elements may be grouped into resource blocks.

SUMMARY

Disclosed herein are systems and implementations for providing PUSCH transmissions with repetitions. The PUSCH transmissions may be used in connection with, for example, ultra-reliable low latency communications (URLLC).

A computing system which may be, for example, a WTRU, may be programmed to receive a slot format configuration (SFC) that indicates flexible symbols, uplink symbols, and downlink symbols. The WTRU may receive an uplink grant that is associated with a PUSCH transmission with repetitions. The received uplink grant may comprise a dedicated slot format indicator (SFI) and a resource map that indicates available resource block groups associated with the uplink symbols.

The SFI may indicate changes to the uplink/downlink designation for symbols. The SFI may indicate a flexible symbol may be used for uplink. The SFI may comprise a bitmap that may identify flexible symbols that may be used for uplink. The SFI may comprise an index to a table that identifies flexible symbols that may be used for uplink.

The resource map may indicate or identify resource block groups that may be unavailable for transmission including PUSCH repetitions. The resource map may indicate a resource priority which may be compared to a priority associated with data to be transmitted in order to determine whether the particular resource may be used to transmit the data.

The WTRU may identify an available uplink symbol based on the SFC, the SFI, and the resource map. An uplink symbol may be identified as available if at least one resource block group of the symbol is indicated as available.

The WTRU may identify, for the available uplink symbol, unavailable resource block groups based on the resource map. The WTRU may perform a PUSCH transmission repetition using the available uplink symbol, wherein the PUSCH transmission avoids the unavailable resource block groups. If the WTRU receives a termination indication, the WTRU may forego transmission of any remaining repetitions.

This summary is provided to introduce a selection of concepts in a simplified form. The concepts are further described herein in the Detailed Description. This Summary is not intended to limit the scope of the claimed subject matter. Other features are described herein.

BRIEF DESCRIPTION OF THE DRAWINGS

A more detailed understanding may be had from the following description, given by way of example in conjunction with the accompanying drawings wherein:

FIG. 5 illustrates an example implementation with orphan symbols;

FIG. 6A illustrates an example implementation with mini slot skipping;

FIGS. 7A and 7B illustrate example implementations with mini-slot truncation;

DETAILED DESCRIPTION

Techniques are disclosed for providing PUSCH transmissions with repetitions. The PUSCH transmissions may be used in connection with, for example, ultra-reliable low latency communications (URLLC). A WTRU may receive a slot format configuration (SFC) that indicates flexible symbols, uplink symbols, and downlink symbols. The WTRU may receive an uplink grant that is associated with the PUSCH transmission with repetitions. The received uplink grant may comprise a dedicated slot format indicator (SFI) and a resource map that indicates available resource block groups associated with the uplink symbols. The WTRU may identify an available uplink symbol based on the SFC, the SFI, and the resource map. An uplink symbol may be identified as available if at least one resource block group of the symbol is indicated as available. The WTRU may identify, for the available uplink symbol, unavailable resource block groups based on the resource map. The WTRU may perform a PUSCH transmission repetition using the available uplink symbol, wherein the PUSCH transmission avoids the unavailable resource block groups. If the WTRU receives a termination indication, the WTRU may forego transmission of any remaining repetitions.

Figure 1A:
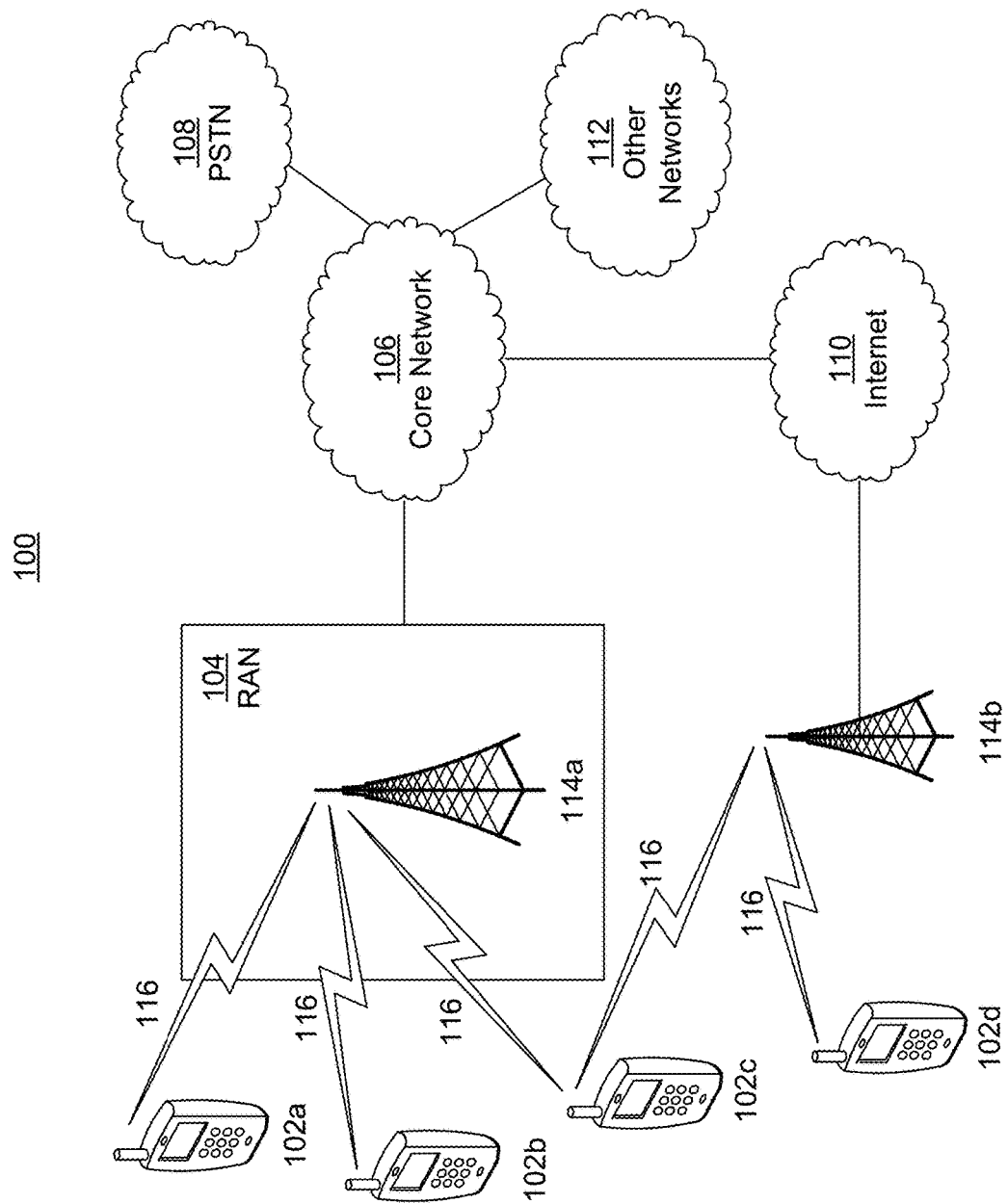
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
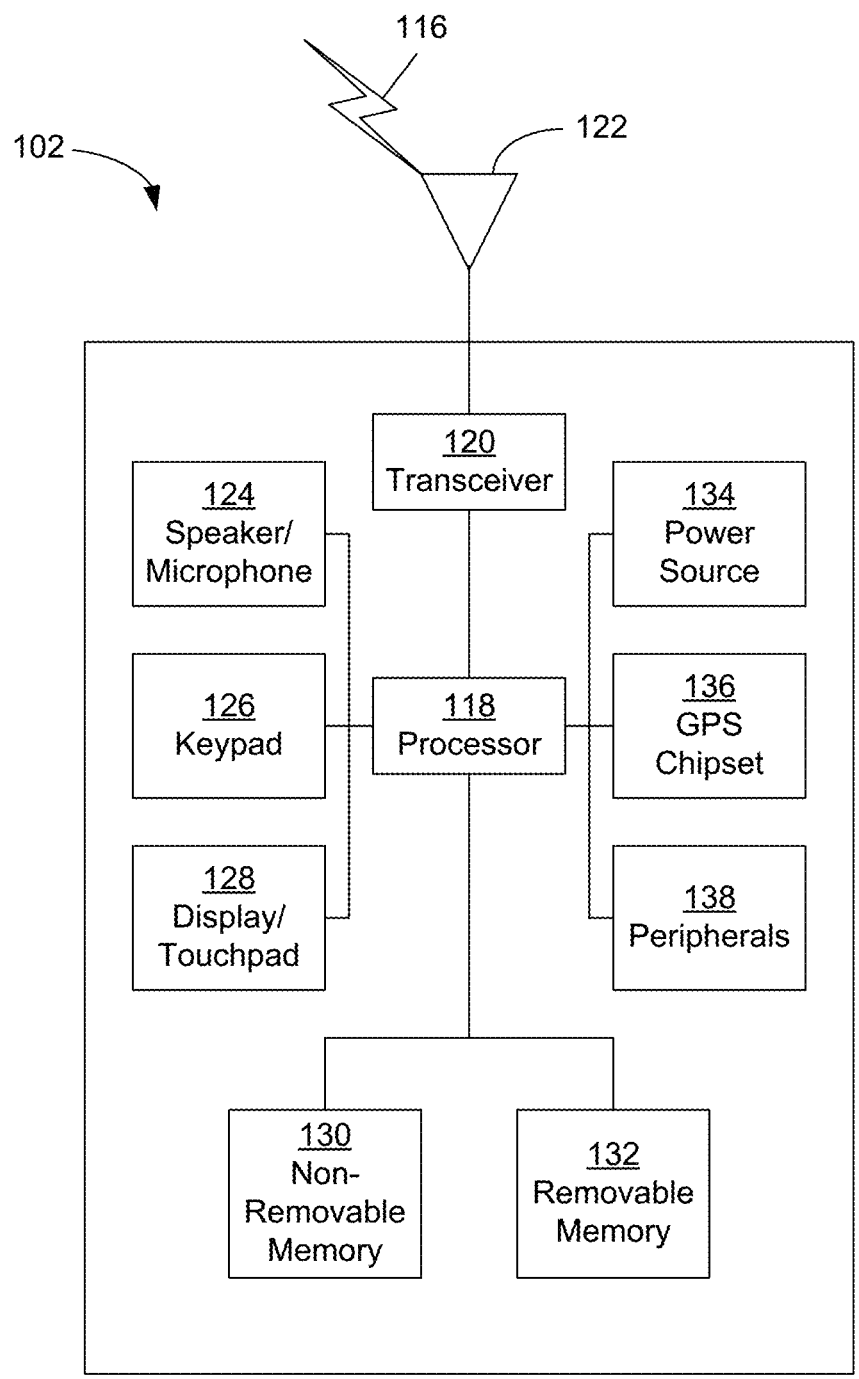
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
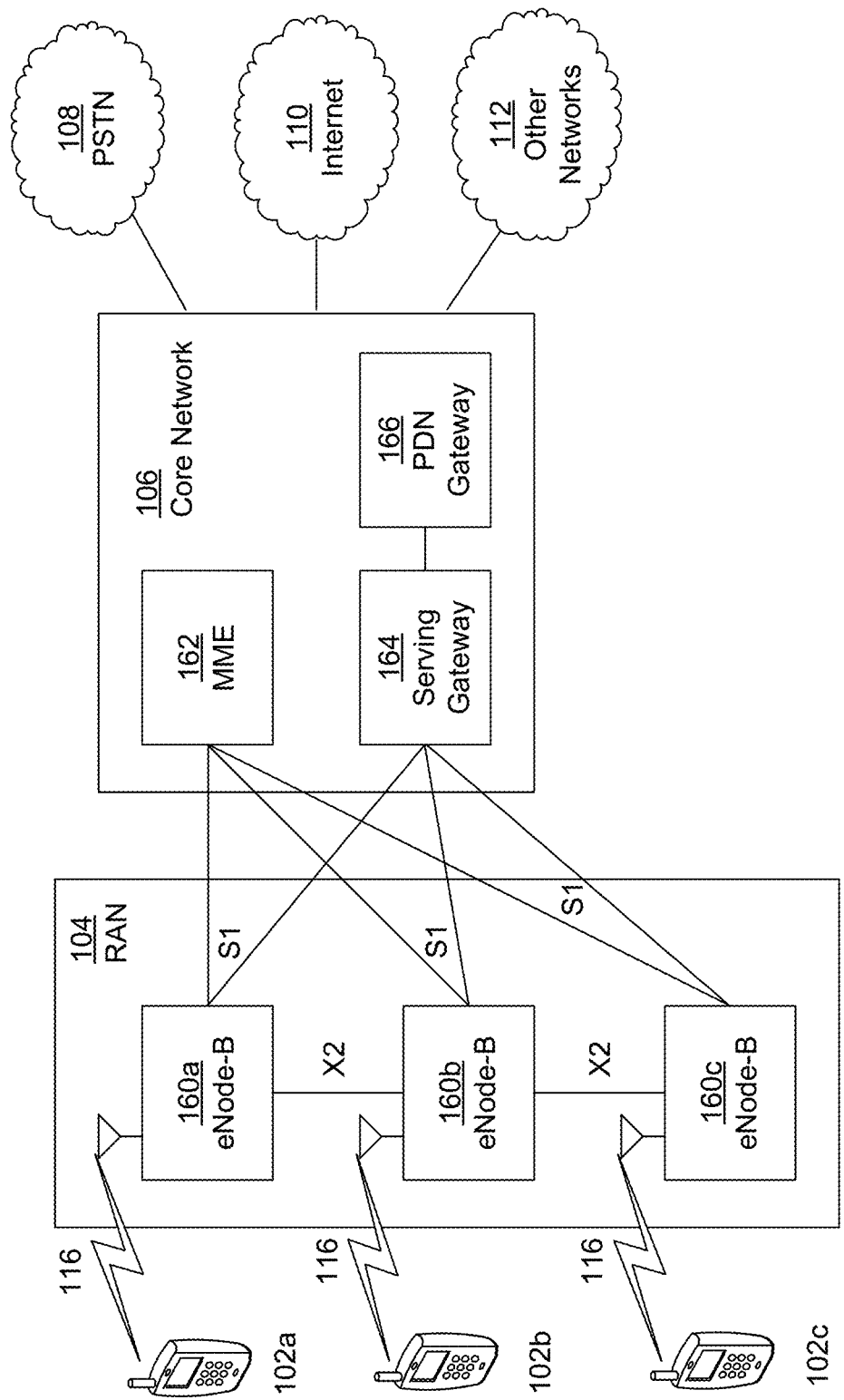
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
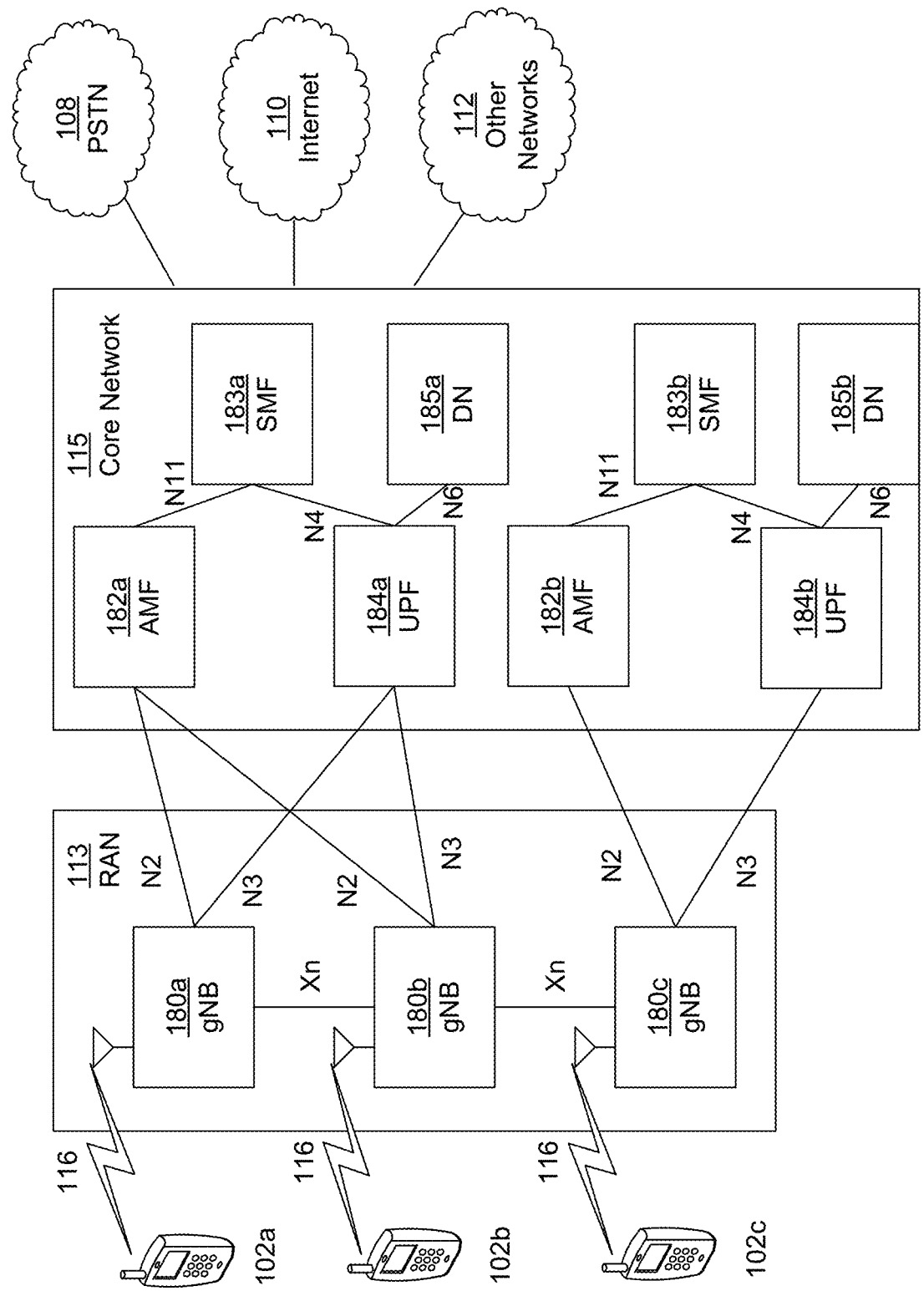
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be coupled (e.g., directly coupled) to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Techniques are disclosed for providing PUSCH transmissions with repetitions. A WTRU may receive a symbol configuration wherein symbols indicated as uplink (UL) may be used for URLLC PUSCH transmission with repetitions. The WTRU may receive an UL grant with a dedicated SFI for symbol reconfiguration and a resource map that identifies unusable resources. The WTRU may determine symbols, and resources within the symbols, to transmit URLLC PUSCH repetitions that avoid collisions.

In wireless systems (e.g., such as NR for 5G), a structure and design may be adopted for a physical uplink shared channel (PDCCH) for transmitting uplink data, as well as its scheduling via the physical downlink control channel (PDCCH).

In NR, for data transmission, a transport block (TB) may include a unit of data transmission comprising of one or multiple Code Block (CB). CBs may include a part of data that may be associated with a block of error correction code and a CRC. A Code Block group (CBG) may include a group of CBs that may be associated with a bit for ACK-NACK. A transport block may comprise of one or more CBGs. A maximum of number CBGs per TB may be configured by higher layer signaling.

In wireless systems (e.g., NR and LTE), data transmission may be generally scheduled dynamically by a gNB, for example, using downlink control information (DCI), which may be transmitted by physical downlink control channel (PDCCH).

A time domain assignment for a physical uplink shared channel (PUSCH) may be scheduled by DCI. A start and length indicator value (SLIV) may be provided. One or more of the following may apply:

The slot where a WTRU transmits PUSCH may be determined by $K_2$ as $$\left\lfloor n \cdot \frac{2^{\mu_{PUSCH}}}{2^{\mu_{PDCCH}}} \right\rfloor + K_2,$$

where n may be the slot with the scheduling DCI. $K_2$ may be based on the numerology of PUSCH. $\mu_{PUSCH}$ and $\mu_{PDCCH}$ may be the subcarrier spacing configurations for PUSCH and PDCCH, respectively.

A starting symbol S relative to the start of the slot, and the number of consecutive symbols L counting from the symbol S allocated for the PUSCH may be determined from the SLIV of an indexed row. One or more of the following may apply. If $(L-1) \leq 7$, SLIV=14·(L−1)+S. If (L−1)>7 SLIV=14·(14−L+1)+(14−1−S), where 0<L≤14−S.

A PUSCH mapping type may be set to Type A or Type B as given by the indexed row.

A WTRU may consider the S and L combinations defined in Table 1 as valid PUSCH allocations.

TABLE 1

| PUSCH mapping type | Normal cyclic prefix | | | Extended cyclic prefix | | |
|---|---|---|---|---|---|---|
| | S | L | S + L | S | L | S + L |
| Type A | 0 | {4, . . . , 14} | {4, . . . , 14} | 0 | {4, . . . , 12} | {4, . . . , 12} |
| Type B | {0, . . . , 13} | {1, . . . , 14} | {1, . . . , 14} | {0, . . . , 12} | {1, . . . , 12} | {1, . . . , 12} |

In 5G NR, frequency hopping may be used as an option for PUSCH transmissions. One or more of the following may apply.

A WTRU may be configured for frequency hopping, for example, of scheduled or configured PUSCH transmission by a higher layer parameter, frequencyHopping, provided respectively in PUSCH-Config or in ConfiguredGrantConfig. One of two frequency hopping modes may be configured: Intra-slot frequency hopping, applicable to single slot; and multi-slot PUSCH transmission. Inter-slot frequency hopping may be applicable to multi-slot PUSCH transmission.

In case of resource allocation type 1, regardless of whether transform precoding may be enabled for PUSCH transmission, a WTRU may perform PUSCH frequency hopping. For example, the WTRU may perform PUSCH frequency hopping if the frequency hopping field in a corresponding detected DCI format or in a random access response UL grant may be set to 1, or if, for a Type 1 PUSCH transmission with a configured grant, the higher layer parameter frequencyHoppingOffset may be provided; otherwise PUSCH frequency hopping may not be performed. If transform precoding and frequency hopping may be enabled for PUSCH, a resource element (RE) mapping may be performed. One or more of the following may apply: the modulated symbols may first be mapped across sub-carriers, then the modulated symbols may be mapped across transform precoded symbols within a frequency-hop, then the modulated symbols may be mapped across frequency hops occupying different sets of PRBs.

For a PUSCH scheduled by DCI format 0_0/0_1 or a PUSCH based on a Type2 configured UL grant and for resource allocation type 1, frequency offsets may be configured by a higher layer parameter, frequencyHoppingOffsetLists, for example, in PUSCH-Config. One or more of the following may apply. If the size of the active bandwidth part (BWP) may be less than 50 physical resource blocks (PRBs), one of two higher layer configured offsets may be indicated in the UL grant. If the size of the active BWP may be equal to or greater than 50 PRBs, one of four higher layer configured offsets may be indicated in the UL grant.

For PUSCH based on a Type1 configured UL grant the frequency offset may be provided by the higher layer parameter, frequencyHoppingOffset, for example, in rrc-ConfiguredUplinkGrant.

A starting RB in each hop may be calculated by (1).

$$RB_{start} = \begin{cases} RB_{start} & i = 0 \\ (RB_{start} + RB_{offset}) \bmod N_{BWP}^{size} & i = 1 \end{cases} \quad (1)$$

Referring to (1), one or more of the following may apply: i=0 and i=1 may include the first hop and the second hop respectively; $RB_{start}$ may include the starting RB within the UL BWP, as calculated from the resource block assignment information of resource allocation type 1; and $RB_{offset}$ may include the frequency offset in RBs between the two frequency hops.

If intra-slot frequency hopping may be configured, the number of symbols in the first hop may be calculated by $\lfloor N_{symb}^{PUSCH,s}/2 \rfloor$, the number of symbols in the second hop may be calculated by $N_{symb}^{PUSCH,s} - \lfloor N_{symb}^{PUSCH,s}/2 \rfloor$, where $N_{symb}^{PUSCH,s}$ may include the length of the PUSCH transmission in OFDM symbols in one slot.

In case of inter-slot frequency hopping, the starting RB during slot may be calculated by (2).

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad (2)$$

Referring to (2), one or more of the following may apply: $n_s^\mu$ may include the current slot number within a radio frame, where a multi-slot PUSCH transmission can take place; $RB_{start}$ may include the starting RB within the UL BWP, as calculated from the resource block assignment information of resource allocation type 1; and $RB_{offset}$ may include the frequency offset in RBs between the two frequency hops.

Techniques associated with PUSCH transmissions may be provided.

A PUSCH transmission instance (e.g., a single PUSCH transmission instance) may not be allowed to cross the slot boundary for grant-based PUSCH transmissions. In examples, an UL grant may schedule two or more PUSCH repetitions in a slot (e.g., a single slot), or across a slot boundary, for example, in consecutively available slots. One or more of the following may apply: mini-slot level repetition, multi-segment transmission, or merged mini-slot and multi-segment transmission.

Mini-slot level repetitions of PUSCH transmissions may be performed. One or more of the following may apply. One or more time domain resources may be determined for mini-slot level repetitions of grant based PUSCH transmissions. For example, the time domain resource assignment field in the DCI may indicate the resource for a repetition (e.g., the first repetition). The time domain resources for the remaining repetitions may be derived, for example, based at least on the resources for the first repetition and the UL/DL direction of the symbols. The repetitions (e.g., each repetition) may occupy contiguous symbols. Frequency hopping for mini-slot level repetition may support (e.g., may at least support) inter-PUSCH-repetition hopping and inter-slot hopping.

Multi-segment PUSCH transmission may be performed. One or more of the following may apply. One or more time domain resources may be determined for multi-segment grant based PUSCH transmissions. The time domain resource assignment field in the DCI may indicate the starting symbol and the transmission duration of the repetitions (e.g., all the repetitions). For the transmission within a slot (e.g., a single slot) for multi-segment transmission: if there may be more than one UL period within a slot, where each UL period may be the duration of a set of contiguous symbols within a slot for potential UL transmission as determined by the WTRU, a repetition (e.g., a single repetition) may be within one UL period and the repetitions (e.g., each repetition) may occupy contiguous symbols; and if there is not more than one UL period within a slot, a single PUSCH repetition may be transmitted within a slot. Frequency hopping for multi-segment transmissions may support (e.g., may at least support) inter-slot frequency hopping.

Merged Mini-slot and Multi-segment PUSCH transmissions may be performed. One or more of the following may apply. One or more actual PUSCH repetitions in a (e.g., one) slot, or two or more actual PUSCH repetitions across a slot boundary in consecutively available slots may be supported using: an (e.g., one) UL grant for dynamic PUSCH transmissions, and a (e.g., one) configured grant configuration for configured grant PUSCH transmissions. Merged Mini-slot and Multi-segment PUSCH transmissions may (e.g., further) comprise one or more of the following. The number of the repetitions signaled by a gNB may represent the "nominal" number of repetitions. The actual number of repetitions may be larger than the nominal number. For example, the number of repetitions may be dynamically or semi-statically signaled for dynamic PUSCH transmission and type 2 configured grant PUSCH transmission. The time domain resource assignment (TDRA) field in the DCI or the TDRA parameter in a type 1 configured grant may indicate the resource for the first "nominal" repetition. The time domain resources for the remaining repetitions may be derived, for example, based at least on the resources for the first repetition and the UL/DL direction of the symbols. For example, the time domain resources may be derived from an interaction (e.g., based on the slot format indicator (SFI)), which may cause different time domain resources to be derived in the UL and DL. If a "nominal" repetition goes across a slot boundary or a DL/UL switching point, the "nominal" repetition may be split into multiple PUSCH repetitions, for example, with a (e.g., one) PUSCH repetition in the (e.g., each) UL periods in a slot. Handling of the repetitions under some conditions (e.g., if the remaining duration may be too small, for example, due to splitting), may be provided. Demodulation Reference Signals (DMRSs) may not be shared across multiple PUSCH repetitions. The maximum TBS size may or may not be increased. L may be associated with a value that may be greater than 14. The value of S+L may be larger than 14. With respect to the FFS, the bit-width for TDRA may be up to 4 bits. In examples, different repetitions may have the same or different redundancy versions (RVs).

In wireless systems (e.g., 5G NR and LTE), uplink data transmission on PUSCH may be scheduled by DCI (e.g., sent by PDCCH). To enhance reliability, PUSCH repetition over multiple slots may be supported. However, in certain designs, repetition in different slots, with the same time allocation pattern (e.g., in terms of allocated symbols) may be supported. For ultra-reliable low-latency communication (URLLC) applications, PUSCH may support higher reliability and lower latency. PUSCH repetitions may be performed such that the PUSCH provides higher reliability and/or lower latency.

PUSCH transmissions may include one or more of the following. An UL grant may support scheduling two or more PUSCH repetitions in consecutive available slots, with one repetition in each slot and possibly different starting symbols and/or durations (e.g., multi-segment transmission).

Implementation(s) for time resource assignment in multi-segment transmission such that the multi-segment transmission efficiently accommodates different starting symbols and/or durations may be provided. A PUSCH may be scheduled. An UL grant may support scheduling two or more PUSCH repetitions that may be in a slot, or across a slot boundary in consecutively available slots (e.g., mini-slot based repetitions).

Figure 2A:
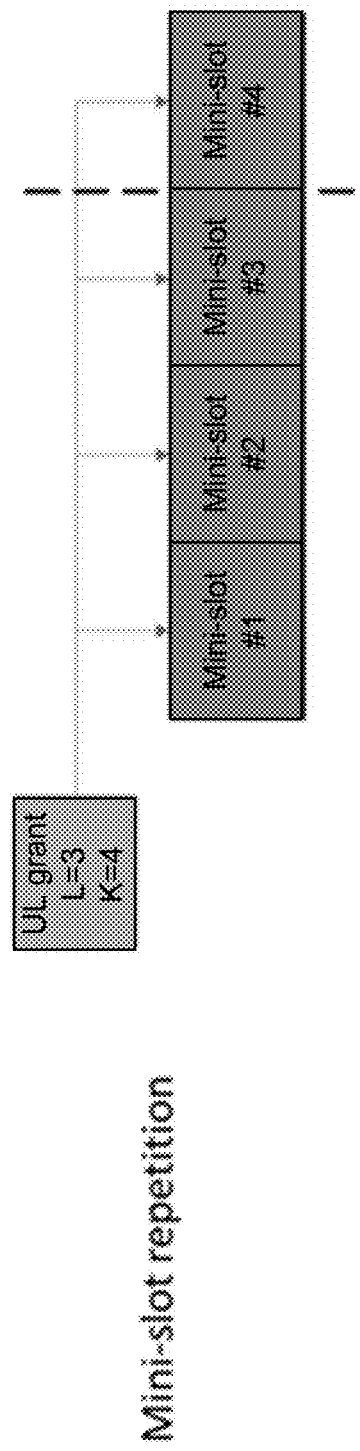
FIG. 2A illustrates example mini-slot repetition.

Repetition may be performed across consecutive mini-slots. FIG. 2A illustrates an example where repetition may be performed across consecutive mini-slots.

A time domain resource assignment field in the DCI may indicate the resource for the first repetition and each repetition that occupies contiguous symbols. This may be represented by the Start and Length Indicator (SLIV) and a repetition factor (K), where S=start symbol within the slot, L=length of the repetition, and K=the number of repetitions. This scheme allows repetition across slot boundaries. The time domain resources for the remaining repetitions may be derived based on the resources for the first repetition and the UL/DL direction of the symbols.

In examples, there may not be any or enough UL symbols in a slot (e.g., to create additional mini-slots) to enable transmission of a repetition. An UL/DL direction may be determined.

One or more of the following may be provided for merged mini-slot and multi-segment PUSCH transmissions. A mechanism to use dynamic UL symbols as the dynamic symbols that are signaled by the SFI in a separate group common PDCCH (GC-PDCCH) that may not have the same reliability as the DCI that signals the URLLC transmission may be provided. In examples, a mechanism to signal the UL/DL symbol structure (e.g., via the SFI) may not be provided.

UL URLLC may use PUSCH aggregation (e.g., repetitions), for example for increased reliability. Mini-slot and/or multi-segment aggregation (e.g., repetitions with variable location per slot, repetitions with variable time duration per slot) may be allowed (e.g., for reduced latency). The WTRU may determine when to transmit the repetitions. Configured UL symbols and flexible symbols dynamically changed to UL by the slot format indicator (SFI) may be used for the repetitions. The SFI may be provided in a group-common PDCCH. SFI may apply to one or more consecutive slots.

SFI reliability may be an issue for UL URLLC. An SFI reliability req't ($10^{-1}$) may be lower than an URLLC UL grant reliability req't ($10^{-6}$). Transmission collision may degrade performance. If the WTRU transmits a PUSCH repetition, performance may be degraded if the PUSCH repetition overlaps a transmission (e.g., SRS, PUCCH, PUSCH)) from another WTRU. Continuing repetitions after the gNB has successfully received the PUSCH may waste resources.

If repeating PUSCH transmissions, the WTRU may avoid collision with transmissions by other WTRUs, reduce resource waste, and/or obtain the SFI reliably.

Signals such as the SRS, PUCCH, PUSCH from the same period, or other periods, and/or transient periods may not be avoided (e.g., may cause interference). In examples, signals such as SRS, PUCCH, PUSCH from the same period, or other periods, and/or transient periods may cause interference to certain WTRUs (e.g., URLLC WTRUs), which may cause interference (e.g., catastrophic interference) at other WTRUs. Additional signaling may be provided.

Multi-segmentation may result in short segments (e.g., UL periods) with an unreasonably high DMRS overhead. Techniques may be provided to mitigate the effect of short segments.

A gNB may terminate the repetitions of transmissions before they may be completed. Techniques to enable the gNB to send termination signals may be provided.

A reference symbol may be used to denote a symbol, such as a complex number that may be fixed and known and may be used as a pilot. A reference signal may be used to denote the time domain signal that may be generated after processing the reference symbols. For example (e.g., in OFDM), the reference symbols may include the complex numbers that may be fed into the IDFT block, while the reference signal may include the output of the IDFT block. A slot may include a unit in a time grid that includes one or more (e.g., 14) OFDM symbols. Downlink control information (DCI) may include a set of bits that may be transmitted over a PDCCH for a user or a group of users. A resource element (RE) may include an OFDM symbol on a subcarrier, and resource element group (REG) may refer to a group of REs, which may be used as the building blocks of a control channel element (CCE). A CCE may assign resource elements to a user. Adjacent REGs in time or frequency that may be grouped together and associated with the precoder may be called REG bundles. As described herein, NR-REG, NR-CCE, and NR-PDCCH may include REG, CCE, and PDCCH (e.g., for the new radio (NR) in 5G). As described herein, WTRU and user may be used interchangeably and/or may refer to the same thing. As described herein, gNodeB and gNB may be used interchangeable and/or may refer to the same thing. A control resource set (CORESET) may include a set of resource elements, which may be used for a downlink control channel. The CORESET may be configured by the CORESET's frequency resources and the CORESET's length in time (e.g., in terms of symbols) and the type of the CORESET's REG bundles. A search space (e.g., or a set of search spaces) may include a set of PDCCH candidates that may be monitored by a WTRU or a group of WTRUs (e.g., during blind detection of PDCCH). A Code Block (CB) may include a part of data that may be associated with a block of error correction code and a CRC. A code Block group (CBG) may include a group of CBs that may be associated with a single bit for ACK-NACK. A transport Block (TB) may include a unit of data transmission comprising of one or multiple CBs. Start and length indicator value (SLIV) may include a parameter that may be used for time domain allocation of data transmission.

Multi-segment transmissions may be provided. Multi-segment PUSCH transmissions may be performed with an adaptive mapping for a start and length indicator value (SLIV). Multi-segment PUSCH transmissions may be performed with one or more (e.g., multiple) SLIVs.

A multi-segment PUSCH transmission may be performed. One or more of the following may apply.

In examples, PUSCH repetitions may be performed with different time resource allocations in different slots.

Multi-segment PUSCH transmissions may include adaptive mapping for SLIV. One or more of the following may apply. PUSCH transmission may be repeated in different slots, for example, with different start symbols and length, which may be indicated by the same SLIV. The SLIV for a first transmission of the PUSCH may be mapped to the start and length of the PUSCH transmission in a slot (e.g., according to the predefined rule). The time resource allocation for a repetition (e.g., the second repetition) of the PUSCH (e.g., and the later repetitions) may be based on different rules.

S2 (e.g., the start symbol for the second repetition of PUSCH) may be mapped to certain numbers, which may be limited to a certain range (e.g., to provide a lower latency for the reception of the second repetition).

Figure 2B:
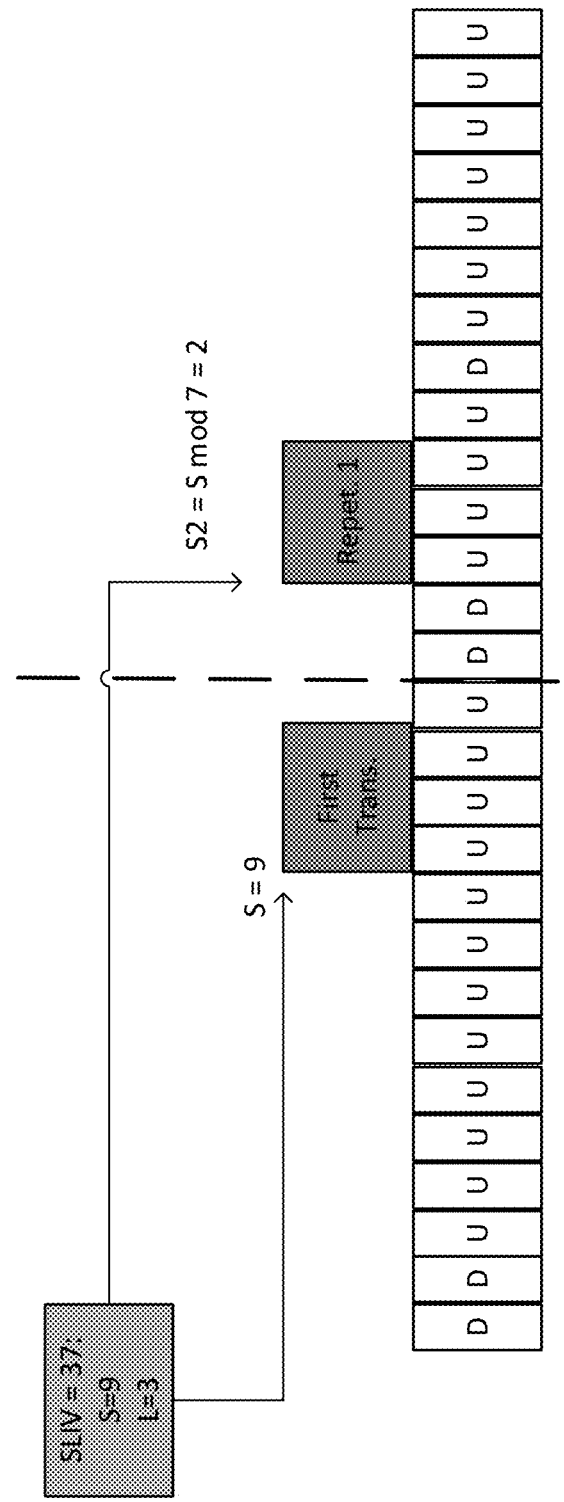
FIG. 2B illustrates example symbol adaption.

FIG. 2B illustrates an example where the start symbol may be adapted for repetition (e.g., to lower latency). S2 may be determined from a value S, which may correspond to the SLIV (e.g., as shown in FIG. 2B). One or more of the following may apply. If $(L-1) \leq 7$, $S2 = S \bmod 7 = (SLIV \bmod 14) \bmod 7$. If $(L-1) > 7$, $S2 = 5$.

In examples, if $L < 7$, S2 may be mapped from SLIV, such that PUSCH repetition avoids being omitted (e.g., because of inconsistent slot format). Inconsistent slot formats may occur, for example, if one or more of the symbols that may be assigned for PUSCH transmission in a slot by the DCI may be designated (e.g., also designated) as DL symbols in the slot format (e.g., either by a semi-static slot format indicator (SFI) or a dynamic SFI, which may be signaled by a group-common DC via a group-common PDCCH). S2 may include values of $(S \bmod 7)$ or $(S \bmod 7)+7$, where S may correspond to the scheduled SLIV (e.g., based on a predefined rule. The value of S2 may depend on which one of $(S \bmod 7)$ or $(S \bmod 7)+7$ may be consistent with the SFI corresponding to that slot. If $(S \bmod 7)$ and $(S \bmod 7)+7$ may be consistent with SFI, S2 may include the value of $(S \bmod 7)$.

Figure 3:
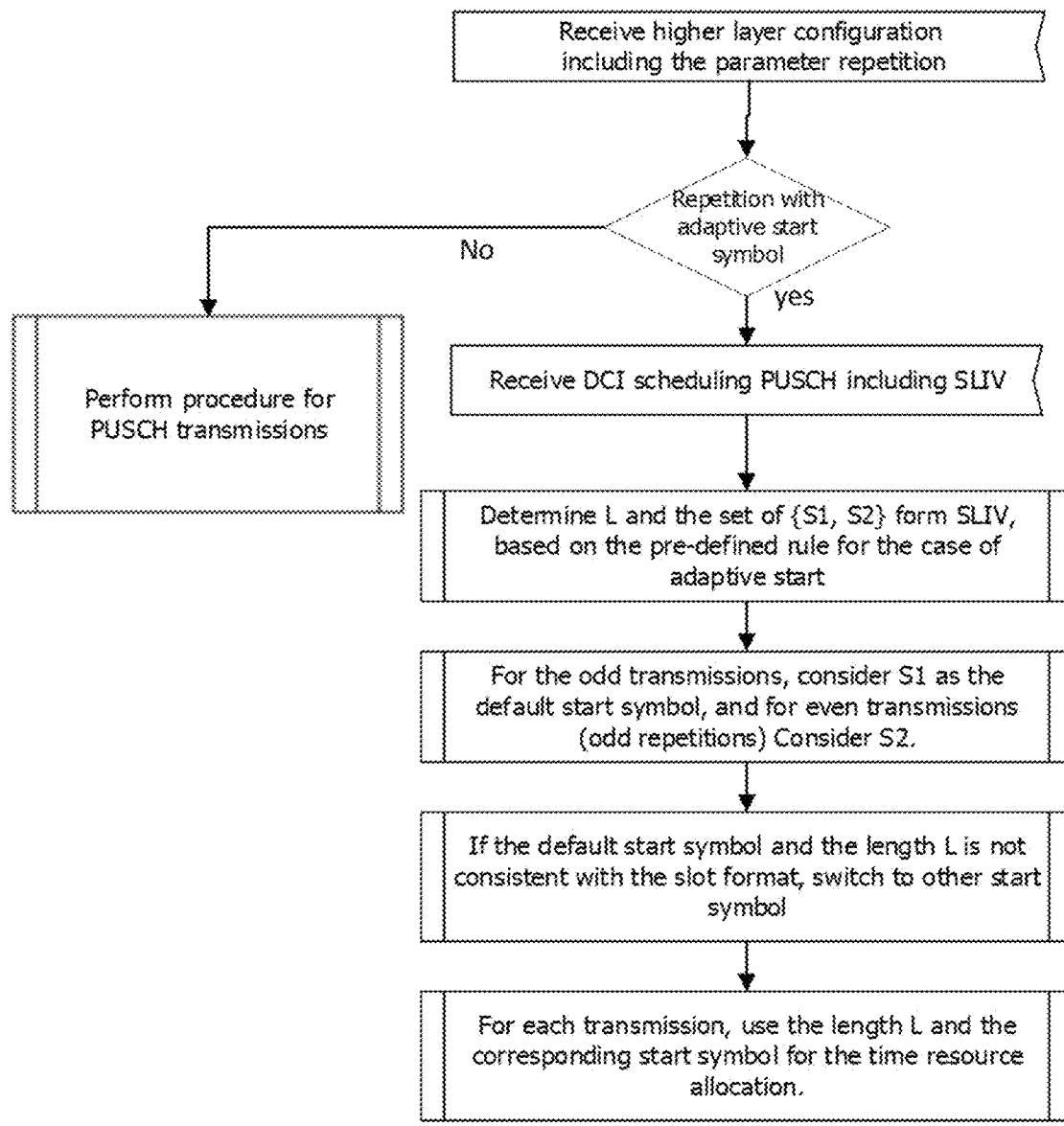
FIG. 3 illustrates an example implementation for an adaptive start symbol.

In examples, one or more values (e.g., two values, $S1 = f1(S)$ and $S2 = f2(S)$) may be obtained from S (e.g., the start value obtained from SLIV). In the odd transmissions (e.g., first, third, fifth, etc. transmissions), S1 may be the default start symbol. In the even transmissions (e.g., or the odd repetitions), S2 may be the default start symbol. If SFI may be inconsistent with a default start symbol (e.g., S1 or S2, depending on whether it may be an odd transmission or an even transmission), another start symbol may be used (e.g., S2 may be used for odd transmissions and S1 may be used for even transmission). FIG. 3 illustrates an example associated with adaptive start symbols, which may be obtained from an (e.g., a single) SLIV.

Multi-segment PUSCH transmission may be performed, for example, with one or more (e.g., multiple) SLIVs. One or more of the following may apply. The starts and/or lengths of transmission repetitions may be signaled. For example, different starts and/or lengths for different repetitions of PUSCH (e.g., PUSCH on different slots) may be signaled using multiple SLIVs (e.g., an SLIV for each of repetition). The PUSCH may be scheduled with a vector for SLIV, which may indicate different values for different repetitions (e.g., instead of one SLIV value for the repetitions). The mapping of SLIV to the start (S) and length (L) of a repetition (e.g., each repetition in time) may be standardized. One or more of the following may apply. If $(L-1) \leq 7$, $SLIV = 14 \cdot (L-1) + S$. If $(L-1) > 7$, $SLIV = 14 \cdot (14-L+1) + (14-1-S)$, where $0 < L \leq 14-S$.

PUSCH transmissions may be scheduled with one or more (e.g., multiple) SLIVs. The SLIVs may be ordered (e.g. may have indices, or included in a vector). The active SLIV (e.g., in each slot) may be chosen based on a first SLIV that may be compatible with the corresponding slot format (e.g., the allocated symbols of the SLIV may not be indicated as DL symbol by the SFI).

In examples, the first SLIV of an ordered set of SLIVs that may be compatible with the slot format for a first transmission may indicate the start and the length of the first transmission. Later repetitions may use the first un-used SLIV that may be compatible with the format of the corresponding slot. For example, the ordered set of SLIVs may be cyclically shifted (e.g., after each transmission). If a PUSCH transmission may be scheduled with multiple SLIVs (e.g., SLIV1, SLIV2, SLIV3, SLIV4) and two repetitions (e.g., three total transmissions), one or more of the following may apply. The first SLIV in the ordered set (SLIV1, SLIV2, SLIV3, SLIV4) that may be compatible with the SFI of the first slot may indicate the start and the length of the first transmission. The first SLIV in the ordered set (SLIV2, SLIV3, SLIV4, SLIV1) that may be compatible with the SFI of the second slot may indicate the start and the length of the second transmission (e.g., first repetition). The first SLIV in the ordered set (SLIV3, SLIV4, SLIV1, SLIV2) that may be compatible with the SFI of the third slot may indicate the start and the length of the third transmission (e.g., the second repetition).

Figure 4:
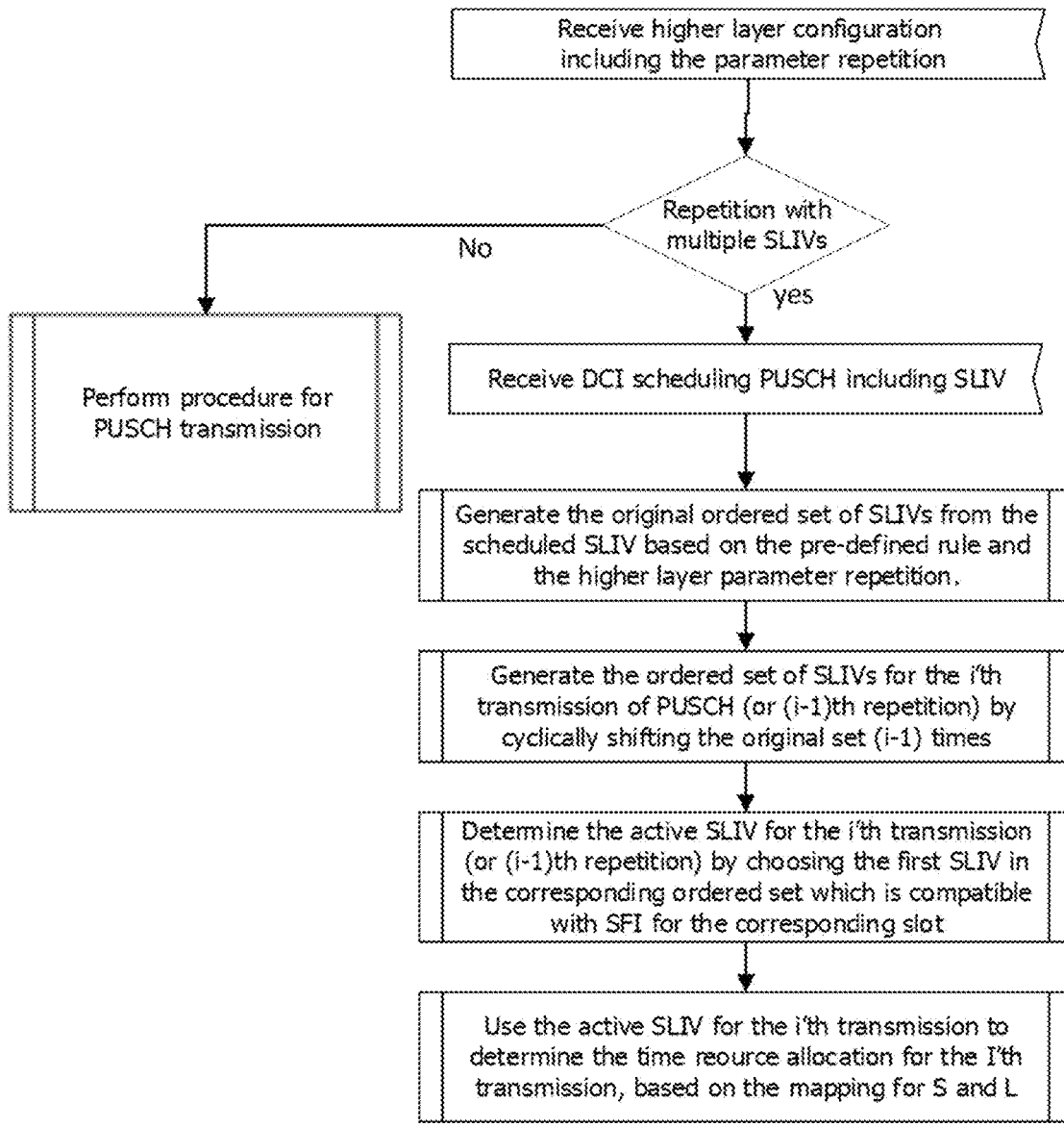
FIG. 4 illustrates an example implementation for adaptive start and length indicator value (SLIV) selection.

An ordered set of SLIVs may be scheduled (e.g., scheduled explicitly by DCI). The first value in the ordered set of SLIVs (e.g., SLIV1) may be indicated by DCI (e.g., explicitly indicated by the DCI), and the other values in the ordered set of SLIVs may be determined, for example, based on the first SLIV and a pre-defined rule. FIG. 4 illustrates an example WTRU implementation for adaptive SLIV selection.

Mini-slot repetition of a transmission may be provided. Mini-slot repetition of a transmission may be performed with similar (e.g., the same) lengths for the respective repetitions. Mini-slot repetition of a transmission may be performed with variable lengths for the respective repetitions. In examples, mini-slot repetition of PUSCH transmissions may be performed with frequency hopping. In examples, mini-slot repetition of PUSCH transmissions may be performed with DMRS sharing and DMRS subset selection.

Mini-slot repetition may be performed for PUSCH transmission. Mini-slot repetitions may be transmitted with the same length. One or more of the following may apply.

Mini-slot repetitions may include the same repetition length (L). The WTRU may use a combination, for example, of the SFI and am UL grant (e.g., the single UL grant) to select the resources for the transmission. The WTRU may select consecutive sets of: L, contiguous uplink (U), or Flexible (F) symbols after the start symbol. The WTRU may skip the sets (e.g., any sets) of uplink (U) or Flexible (F) symbols that number less than the repetition length (L), which may be requested by the UL grant. The WTRU may move on to a next resource (e.g., the next correctly sized resource resulting in non-consecutive mini-slots with each mini-slot comprising contiguous symbols). FIG. 5 illustrates an example where mini-slot repetitions include the same repetition length (L). Referring to FIG. 5, one or more of the following may apply: L=4, K=4, the SFI for slot 1 may result in a (e.g., one) gap between the first and second repetition (e.g., for the DL symbol and F symbol to allow for symbol switching), and an orphan last symbol may not be used. The SFI in slot 2 may result in a gap.

A WTRU may use a combination, for example, of the SFI indicator and the UL grant parameters to: perform rapid estimation of whether a slot may be mini-slot repetition capable, and/or indicate (e.g., to the gNB) a request to override the mini-slot repetition parameters.

Figure 6B:
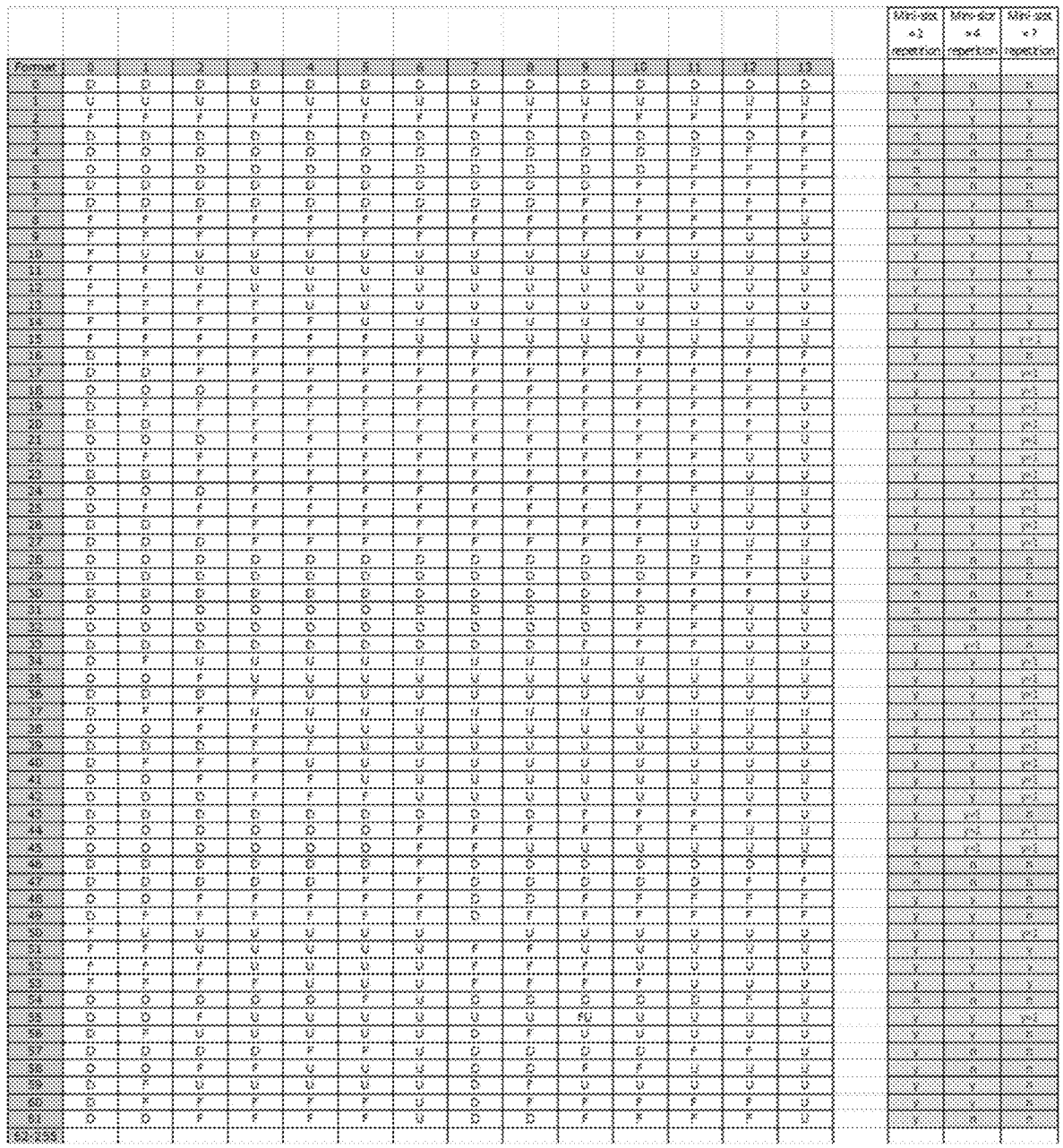
FIG. 6B illustrates an example implementation with slot repetition.

Referring now to FIG. 6B, one or more of the following may apply. A slot may be support mini-slot repetition, for example, if the slot supports a (e.g., more than one) mini-slot of the requested length based on the SFI, which may be illustrated for mini-slot sizes 2, 4, and 7 in FIG. 6B. In examples, given SFI 7, a device (e.g., a WTRU or an STA) may determine (e.g., determine based on FIG. 6B) that multiple mini-slots within a slot (e.g., the same slot) may not be supported (e.g., given a starting position S). The device may determine (e.g., determine based on FIG. 6B) that the device may wait (e.g., may wait for the entire slot) to start the first transmission. The device may send a scheduling request (SR), which may include a request for a higher priority transmission.

Based on an UL grant and the received SFI, a WTRU may identify the probability that the WTRU may be able to satisfy the characteristics (e.g., ultra-reliability and latency requirements) of a transmission and transmit a request to another device (e.g., a gNB). For example, the WTRU may transmit a request for an override (e.g., in the current UL grant parameters).

A WTRU may not transmit on a certain mini-slot (e.g., a mini-slot without enough resources), which may result in the total number of retransmissions being less than the number defined by an UL grant (e.g., as shown in FIG. 6A. FIG. 6A illustrates an example where a mini-slot without enough resources may be skipped.

Mini-slot repetitions of variable lengths may be provided. One or more of the following may apply.

Mini-slot repetitions may include variable lengths, for example, to allow for resources of different sizes to be filled. A WTRU may use a combination, for example, of the SFI and an UL grant, to select the resources for a transmission. The WTRU may select consecutive sets of L contiguous uplink (U) symbols or Flexible (F) symbols after a start symbol. Rather than skipping a set of U symbols or F symbols that includes a number less than the repetition length (L) requested by an UL grant, the WTRU may fit the information within a resource using one or more of the following: truncation or rate matching; or preconfigured minimum allowable lengths (e.g., multiple SLIVs or multiple lengths per SLIV).

As described herein, a WTRU may fit a mini-slot without enough resources to the available resources by either rate matching within the resource or truncating the transmission. FIGS. 7A and 7B illustrate an example where a transmission may be truncated on a mini-slot without enough resources.

Figure 8:
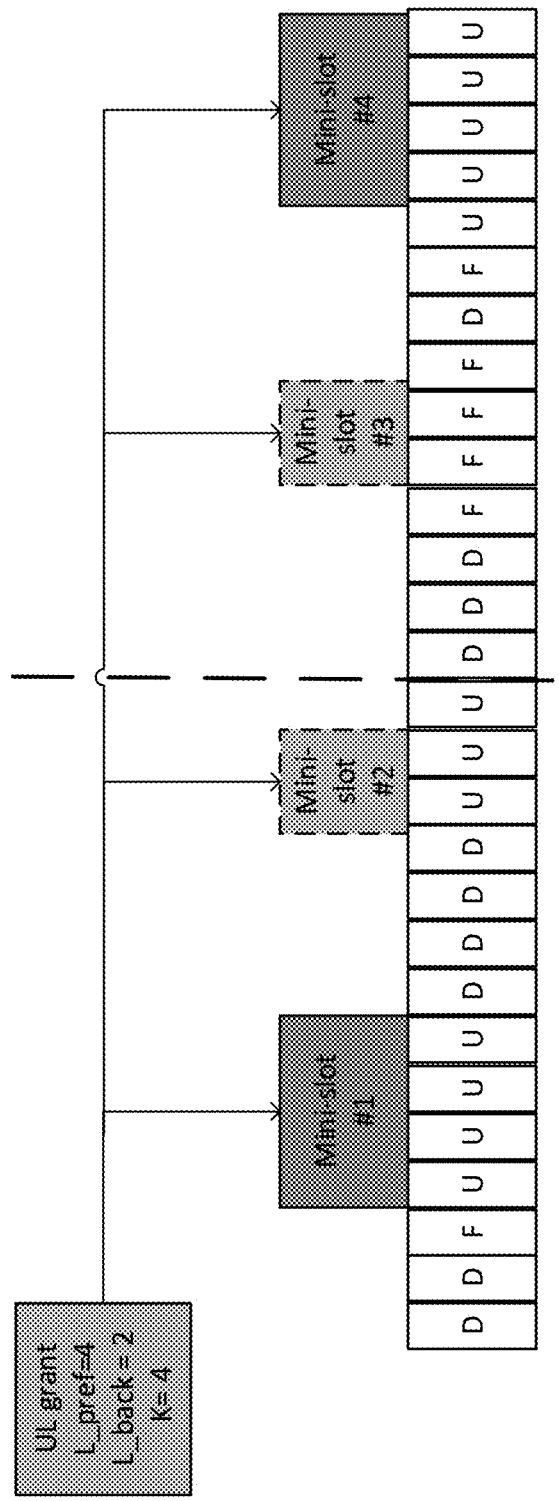
FIG. 8 is an example illustration associated with mini-slot length and repetition.

As described herein, a WTRU may be configured with a minimum allowable length within which the WTRU may transmit a repetition. In examples, the WTRU may be configured with one or more (e.g., multiple discrete) SLIV values, which may enable the WTRU to choose a packet to send on a resource (e.g., dynamically chose the best packet to send based on the identified resource (see FIG. 8)). FIG. 8 illustrates an example associated with a flexible allowable length for a repetition. As illustrated in FIG. 8, a WTRU may or may not truncate or rate-match a transmission (e.g., in real-time) based on the available resources. The WTRU may be configured with one or more lengths (e.g., a preferred maximum length, a minimum length, and a fall-back length in the case of limited resources). In examples, a resource that may be less than a minimum length may be skipped. One or more of the following may apply.

A WTRU may send a SR (e.g., URLLC SR) to a gNB. For example, the SR may indicate reliability and latency requirements. The WTRU may receive an SFI for a slot (e.g., a current slot). The WTRU may monitor the PDCCH and may decode DCI for PUSCH repetitions, which may indicate an UL grant. The DCI may indicate one or more of the following: a start of grant, a preferred grant length, a fall-back grant length, and/or a maximum number of slots to transmit in. The WTRU may estimate repetition compatibility, for example, based on a start of grant, length of grant, and SFI. If the WTRU estimates that repetition may be compatible, the WTRU may continue transmission. If the WTRU estimates that repetition may not be compatible, the WTRU may send a signal to a gNB, which may request and increase in priority/reliability.

The WTRU may construct a PUSCH allocation for a slot (e.g., current slot). The WTRU may create symbol allocations for repetition.

The allocation may include equal sized non-consecutive allocations of contiguous symbols (e.g., for each repetition). One or more of the following may apply. The WTRU may transmit in one or more subsequent slots until the configured number of repetitions may be performed. The WTRU may transmit in one or more subsequent slots until a number (e.g., a maximum number) of slots parameter is reached. The WTRU may skip one or more resources/repetitions (e.g., any resource/repetition that does not have enough resources).

A WTRU may create symbol allocations for repetition. The allocation may include unequal sized non-consecutive allocations of contiguous symbols for each repetition. One or more of the following may apply. The WTRU may transmit in one or more subsequent slots until the configured number of repetitions may be performed. The WTRU may transmit on one or more subsequent slots until the maximum number of slots parameter is reached. The WTRU may rate match, truncate, or use a minimum length for a resource/repetition (e.g., any resource/repetition that does not have enough resources).

DMRS sharing with mini-slot repetition may be provided. Within a mini-slot repetition (e.g., each mini-slot repetition), a WRTU may (e.g., explicitly or implicitly) indicate DMRS sharing with a previous mini-slot. In an explicit DMRS sharing, a WTRU may be assigned a set of DMRS indices. A WTRU that performs DMRS sharing with its next N mini-slots may send a DMRS that includes an indication of N on the mini-slots that includes the DMRS. The next N mini-slots may send information without a DMRS. In implicit DMRS sharing, a WTRU may assume DMRS sharing based on parameters which may comprise one or more of the following parameters: the mini-slot length (e.g., if L=2 or 4, DMRS sharing may be assumed. If L=7, DMRS sharing may be turned off); the interval between repetitions (e.g., which may be gNB configured or configured based on a channel modification estimator, such as a Doppler estimator); and/or whether the available resources may be less than a pre-defined parameter.

If DMRS sharing is turned on, DMRS sharing may impact frequency hopping (FH), for example, as the frequency hopped resources may be associated with a separate DMRS. A mini-slot that shares DMRS with a previous mini-slot may set its frequency hopping pattern similarly to (e.g., identical to) the frequency hopping pattern of the previous mini-slot. In examples, if the FH indicator is set to true (e.g., is on), the WTRU may determine (e.g., implicitly determine) that DMRS sharing may be inactive.

Figure 9:
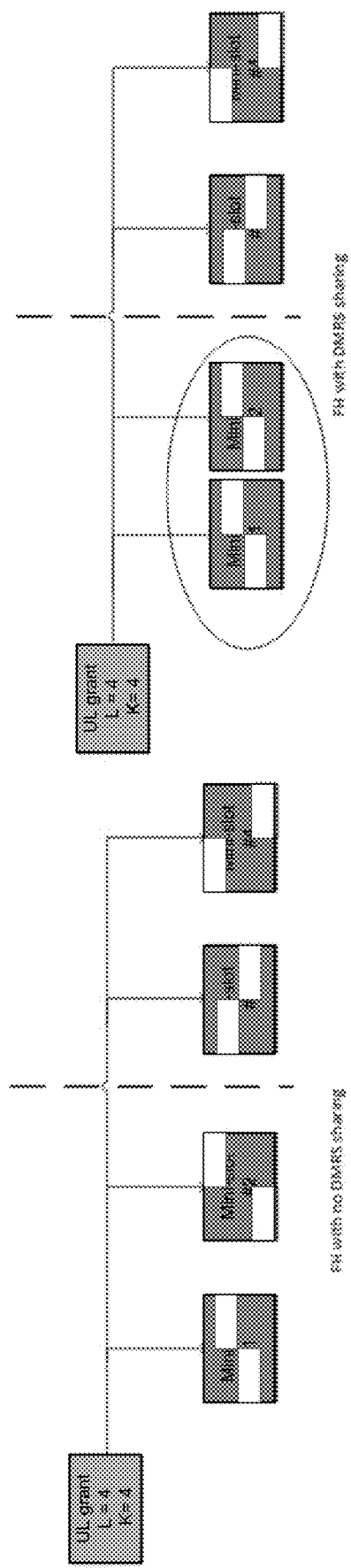
FIG. 9 illustrates an example implementation with frequency hopping.

FIG. 9 illustrates an example associated with frequency hopping and DMRS sharing. As illustrated in FIG. 9, inter-mini-slot repetition with hopping (e.g., frequency hopping) may be performed. A WTRU may adjust the frequency position within a mini-slot (e.g., each mini-slot with frequency hopping between mini-slots) based on the UL-DL-F symbols (e.g., the available UL-DL-F symbols). A hop (e.g., a single hop) per repetition may be defined. The hop positions (e.g., between repetitions) may be changed. The FH pattern of a mini-slot that shares the DMRS may be overridden. The FH patterns of mini-slots (e.g., mini-slot that do not shares the DMRS) may stay the same (e.g., as shown in the FIG. 9). The FH hopping patterns of a mini-slot may be modified (e.g., the entire FH pattern may be shifted).

Figure 10:
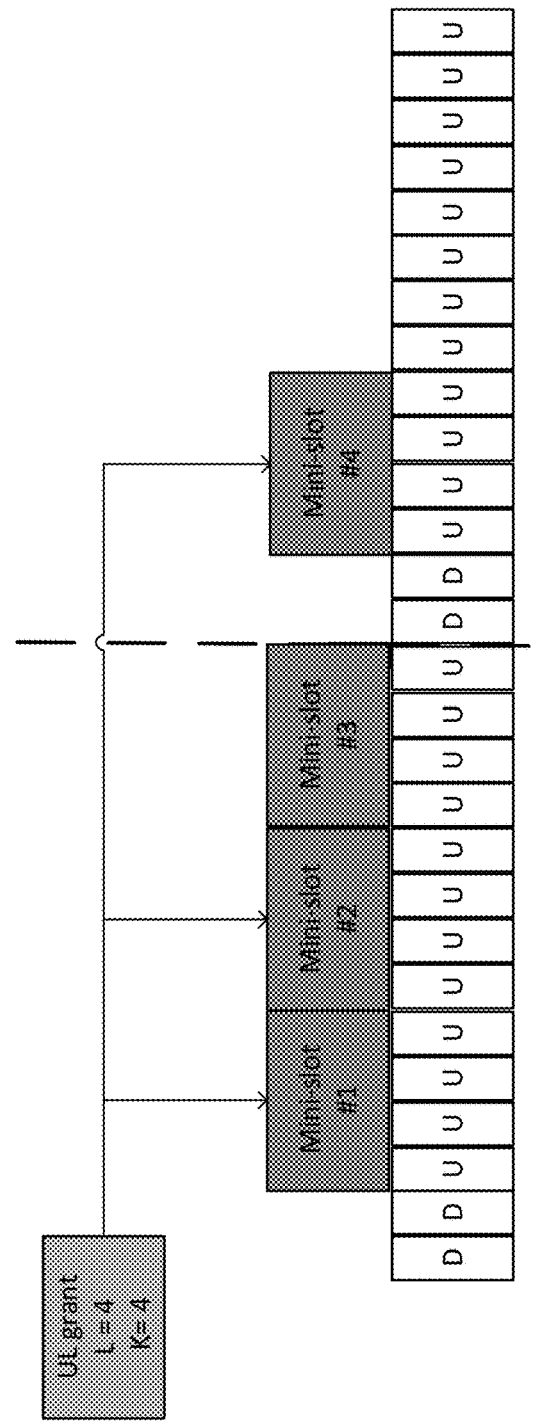
FIG. 10 illustrates an example implementation with mini-slot transmissions; and, FIG. 11 illustrates an example implementation with URLLC PUSCH repetition.

A DMRS subset may be selected for mini-slot repetition. One or more of the following may apply. A DMRS may be shared among two or more mini-slots. In examples, the DMRS may be shared for a subset of the mini-slots inside a slot. The DMRS may be shared among all the mini-slots inside the slot (e.g., including the mini-slots that may not include any DMRS). The selection of mini-slots that include DMRS may be based on signaling (e.g., dynamic signaling via DCI). A DMRS subset allocation may be configured (e.g., semi-statically configured), for example, by higher layer signaling. The mini-slots that include DMRS may be selected based on one or more rules (e.g., pre-defined rules). In examples, a mini-slot that may be closest to the center of the slot may be selected to include DMRS and the DMRS of the selected mini-slot may be shared by the mini-slots in the slot (e.g., all the mini-slots in the slot). FIG. 10 illustrates an example associated with DMRS sharing. As illustrated in FIG. 10, a mini-slot transmission inside each slot may be selected for DMRS sharing (e.g., the mini-slot that may be closest to the center of the slot).

Repetition of a PUSCH transmission may be performed with frequency hopping. Mini-slot repetition may be enabled. Frequency hopping (e.g., of at least 2 hops) may be implemented for: inter-PUSCH-repetition hopping, and inter-slot hopping.

Mini-slot repetition may be performed, for example, such that a repetition (e.g., each repetition) may include contiguous symbols. One or more mini-slots may not include enough resources to complete a transmission. The transmission may be performed on non-contiguous mini-slots. One or more of the following may be performed: intra-mini-slot hopping with repetition; intra-mini-slot hopping with repetition hopping; inter-mini-slot repetition with hopping; or inter-PUSCH-repetition hopping.

In intra-mini-slot hopping with repetition, a WTRU may hop frequencies within a mini-slot (e.g., each mini-slot). The mini-slot transmissions may include a repetition (e.g., an exact or almost exact repetition) of a first transmission, for example, considering the available UL-DL-F symbols. One or more (e.g., multiple) hops may be defined per repetition. The hop positions may be fixed, for example, between repetitions.

In intra mini-slot hopping with repetition hopping, a WTRU may hop frequencies within a mini-slot (e.g., each mini-slot). The frequency hopping locations within the mini-slot may differ from that of a previous mini-slot repetition, for example, considering the available UL-DL-F symbols. One or more (e.g., multiple) hops may be defined per repetition. The hop positions may be changed, for example, between repetitions.

In inter-mini-slot repetition with hopping, a WTRU may fix the frequency position within a mini-slot (e.g., each mini-slot). Frequency hopping between mini-slots may be performed considering the available UL-DL-F symbols. A hop (e.g., a single hop) may be defined per repetition. The hop positions may be changed, for example, between repetitions.

Combined mini-slot and multi-segment repetitions of PUSCH transmissions may be performed. One or more of the following may apply.

A dynamic SFI may be provided for combined mini-slot and multi-segment repetitions. A WTRU may derive an UL transmission structure, which may include, for example: an indication of the number of repetitions; an indication of the number of symbols per repetition (e.g., based on the information sent in the DCI about the start and duration of the first repetition); and an indication of the number of nominal repetitions. The actual number of repetitions may be larger than the indication of the number of nominal repetitions, e.g., if, based on a DL/UL switch or based on a slot boundary, the WTRU determines to split the number (e.g., the total number) of symbols for a nominal repetition into two repetitions (e.g., two separate repetitions). Knowledge of the DL/UL structure of the slot may be used (e.g., by the WTRU and/or the gNB) to determine the resource allocations for the (e.g., each) repetitions (e.g., in the case of dynamic TDD where the gNB may send an SFI in a DCI format 2-0 message to dynamically change the slot format). The SFI may be signaled in a separate DCI, which may, for example, not be reliable for certain WTRUs (e.g. URLLC WTRUs). The SFI may be transmitted using a low aggregation level (e.g., the lowest aggregation level). If, for example, the SFI may be transmitted using the lowest aggregation level, the SFI may be associated with a higher level of reliability. The SFI may be transmitted as part of the URLLC DCI, which may provide the URLLC DCI and the SFI to be associated with a similar (e.g., the same) level of reliability. The SFI may be indexed in a restricted SFI table with a limited number of entries, which may provide a compact DCI with a small payload. The URLLC SFI table may be pre-defined or may be RRC configured.

Signaling for resource avoidance may be provided. One or more of the following may apply.

The gNB may signal resources that the WTRU is to avoid which may include, for example, SRS, PUCCH, PUSCH signals from the same period, other periods, and/or transient periods. The WTRU may, for example, rate match around these resources, and/or puncture its transmission on these resources.

The signaling may be based, for example, on a bitfield or bitmap, which can be mapped to the resources that the UL repetition spans indicating, e.g., explicitly indicating, the frequency and time of the resources in RBs and OFDM symbols. The granularity for time-frequency resources may be semi-statically configured by a higher layer. In examples, the signaling in frequency may be based on Resource Block and/or Resource Block Groups (RBGs). The signaling in time may be based on OFDM symbols, OFDM Symbol Groups, mini-slot, Slots, and/or subframes. The signaling may be a DCI that sends an index to a table indicating the desired bitfield A gNB may signal the usable resources to a WTRU in a WTRU-specific manner (e.g., using a WTRU-specific PDCCH), or to a group of WTRUs in a grouped manner (e.g., using a group-common PDCCH). The gNB may signal a time-frequency bit-map that indicates the resources that may or may not be used. The gNB may signal an index to a time-frequency bit-map configuration that indicates the resources that may or may not be used. The WTRU may read the bit-map and perform rate matching around the resources indicated as non-usable by the bit-map. The WTRU may read the bit-map and puncture its data that coincides with the resources indicated as non-usable by the bit-map.

The signaling of a bit-map may be associated with one or more of the following. The granularity of the bit-map may be fixed and pre-defined. The granularity of the bit-map may be configurable by the gNB. Characteristics of the bit-map (e.g., the specific bit-map used, the granularity of the bit-map, if the bit-map may be active, etc.) may be configured (e.g., RRC configured by the gNB to the WTRU(s)). An actual bit-map may be signaled to the WTRU. The bit-map may be dynamically signaled to the WTRU. For example, the bit-map may be signaled by indexing a set of preconfigured tables to the WTRU. The bit-map may indicate the availability of resources, for example, based on the (e.g., all the) resources available for transmission. The bit-map may indicate the transmission resources and the non-transmission resources. Table 2 is an illustration of an example transmission/non-transmission bit-map, where resources that may not be used are indicated by zeros (e.g., non-transmission resources), and where the resources that may be used may be indicated by ones (e.g., transmission resources). The resource block groups (RBGs) may indicate the granularity of the signaling, for example, in the frequency domain. The symbol axis granularity may be, for example, on a per symbol basis (e.g., as shown in Table 2), on a per configured symbol group basis, on a per slot basis, or on a per mini-slot basis.

TABLE 2

|  | RBG0 | RBG1 | RBG2 | RBG3 |
|---|---|---|---|---|
| Symbol 0 | 0 | 0 | 0 | 0 |
| Symbol 1 | 1 | 1 | 1 | 1 |
| Symbol 2 | 1 | 1 | 1 | 1 |
| Symbol 3 | 1 | 1 | 1 | 1 |
| Symbol 4 | 0 | 0 | 0 | 0 |
| Symbol 5 | 0 | 0 | 0 | 0 |
| Symbol 6 | 0 | 0 | 0 | 0 |
| Symbol 7 | 1 | 1 | 1 | 1 |
| Symbol 8 | 1 | 1 | 1 | 1 |
| Symbol 9 | 1 | 1 | 1 | 1 |
| Symbol 10 | 1 | 1 | 1 | 1 |
| Symbol 11 | 1 | 1 | 1 | 1 |
| Symbol 12 | 1 | 1 | 1 | 1 |
| Symbol 13 | 0 | 0 | 0 | 0 |

The bit-map may indicate the availability of resources based on (e.g., based only on) the resources available for UL transmission or the resources available for UL transmission and flexible resources (e.g., in combination with the SFI, as illustrated in Table 4). Table 3 is an example illustration of transmission/non-transmission bit-map with SFI. As illustrated in Table 4, the resources that coincide with DL symbols may not be indicated or signaled. As shown, symbols 0, 1 and 2 may be omitted as they coincide with the downlink symbols/resources signaled by the SFI in Table 3. Table 4 is an example illustration of a bit-map associated with resource block groups (RBGs).

TABLE 3

|  | SFI |
|---|---|
| Symbol 0 | D |
| Symbol 1 | D |

TABLE 3-continued

|  | SFI |
|---|---|
| Symbol 2 | D |
| Symbol 3 | F |
| Symbol 4 | F |
| Symbol 5 | F |
| Symbol 6 | U |
| Symbol 7 | U |
| Symbol 8 | U |
| Symbol 9 | U |
| Symbol 10 | U |
| Symbol 11 | U |
| Symbol 12 | U |
| Symbol 13 | U |

TABLE 4

|  | RBG0 | RBG1 | RBG2 | RBG3 |
|---|---|---|---|---|
| Symbol 3 | 1 | 1 | 1 | 1 |
| Symbol 4 | 0 | 0 | 0 | 0 |
| Symbol 5 | 0 | 0 | 0 | 0 |
| Symbol 6 | 0 | 0 | 0 | 0 |
| Symbol 7 | 1 | 1 | 1 | 1 |
| Symbol 8 | 1 | 1 | 1 | 1 |
| Symbol 9 | 1 | 1 | 1 | 1 |
| Symbol 10 | 1 | 1 | 1 | 1 |
| Symbol 11 | 1 | 1 | 1 | 1 |
| Symbol 12 | 1 | 1 | 1 | 1 |
| Symbol 13 | 0 | 0 | 0 | 0 |

In examples, the DL symbols/resources and the flexible symbols/resources may not be indicated, which may reduce the transmission overhead. Table 5 is an example illustration of a bit-map associated with RBSs. As shown in Table 5, symbols 0, 1, 2, 3, 4 and 5 may be omitted (e.g., as they coincide with the downlink and flexible symbols/resources signaled by the SFI in Table 3)

TABLE 5

|  | RBG0 | RBG1 | RBG2 | RBG3 |
|---|---|---|---|---|
| Symbol 6 | 0 | 0 | 0 | 0 |
| Symbol 7 | 1 | 1 | 1 | 1 |
| Symbol 8 | 1 | 1 | 1 | 1 |
| Symbol 9 | 1 | 1 | 1 | 1 |
| Symbol 10 | 1 | 1 | 1 | 1 |
| Symbol 11 | 1 | 1 | 1 | 1 |
| Symbol 12 | 1 | 1 | 1 | 1 |
| Symbol 13 | 0 | 0 | 0 | 0 |

One or more rules may be pre-defined for certain scenarios. For example, a rule may include placing (e.g., always placing) a transient resource after an UL/DL switch, where a URLLC WTRU is to avoid the transient resources after an UL/DL switch. One or more rules may be pre-defined and combined with signaling for certain scenarios. For example, a rule may include that the gNB is to indicate if a transient resource is to be used, for example, based on explicit signaling or WTRU capability, where the URLLC WTRU is to avoid the transient resources (e.g., if the use of a transient resource is indicated). In examples, the gNB may signal a resource priority map to the WTRU. The signaling may be transmitted to a specific WTRU (e.g., in a WTRU-specific PDCCH) or to a group of WTRUs (e.g., all the URLLC WTRUs, for example, in a group common PDCCH). The WTRU may derive the allowed resources based, for example, on the priority of WTRU's transmission (e.g., which may be signaled to the WTRU during the DCI or may be derived autonomously by the WTRU) and the priority of the resource(s). In examples, the WTRU may not transmit in a resource (e.g., a non-transmission resource) that may be associated with a priority greater than or greater than or equal to the WTRU's priority. A WTRU may compare the priority of a resource with the priority of the WTRU's transmission. The WTRU may avoid transmitting in the resource if, for example, the priority of the resource may be greater than the priority of the WTRU's traffic. The granularity of the priority map may be fixed, predefined, or configurable (e.g., based on the number of priorities used). In examples, if the number of priorities is n, the granularity of the bits in the bit-map may be signaled in multiples of ceiling(log 2 (n)) resources. In examples, if the number of possible priorities is eight (8), three (3) bits may be used to signal the priority of a resource and the resources may be signaled in groups of three. Table 6 is an example illustration of a 3-bit resource priority map. As illustrated in Table 6, the priority values may range from zero (000) to seven (111), where the maximum priority may be seven (111). In examples, three (3) RBGs may be grouped together to form a priority signaling group. The priority of the priority signaling group may be signaled in a resource priority map and the WTRU may use the resource priority map and the priority of the respective priority signaling group, for example, to identify the resources that the WTRU may transmit on.

TABLE 6

| | Group 1 | | | Group 2 | | |
|---|---|---|---|---|---|---|
| | RBG0 | RBG1 | RBG2 | RBG3 | RBG4 | RBG5 |
| Symbol 0 priority | 1 | 1 7 | 1 | 1 | 1 7 | 1 |
| Symbol 1 priority | 1 | 1 7 | 1 | 1 | 1 7 | 1 |
| Symbol 2 priority | 0 | 0 0 | 0 | 0 | 0 0 | 0 |
| Symbol 3 priority | 0 | 0 0 | 0 | 0 | 0 0 | 0 |
| Symbol 4 priority | 0 | 1 2 | 0 | 0 | 1 2 | 0 |
| Symbol 5 priority | 0 | 1 2 | 0 | 0 | 1 2 | 0 |
| Symbol 6 priority | 0 | 1 2 | 0 | 0 | 1 2 | 0 |
| Symbol 7 priority | 0 | 1 2 | 0 | 0 | 1 2 | 0 |
| Symbol 8 priority | 0 | 1 2 | 0 | 0 | 1 2 | 0 |
| Symbol 9 priority | 0 | 1 2 | 0 | 0 | 1 2 | 0 |
| Symbol 10 priority | 0 | 1 2 | 0 | 0 | 1 2 | 0 |
| Symbol 11 priority | 0 | 1 2 | 0 | 0 | 1 2 | 0 |
| Symbol 12 priority | 0 | 1 2 | 0 | 0 | 1 2 | 0 |
| Symbol 13 priority | 1 | 1 7 | 1 | 1 | 1 7 | 1 |

Table 7 is an example illustration of transmission (e.g., indicted by an "x") and non-transmission (e.g., indicated by an "o") resources based on a priority bit-map and a WTRU priority of 5 (101). As illustrated in Table 7, a WTRU may transmit on resources marked with an "x," where a priority of 5 for the WTRU is greater than or equal to the values of RBGs marked with an "x" (e.g., see Table 6).

TABLE 7

| | Group 1 | | | Group 2 | | |
|---|---|---|---|---|---|---|
| | RBG0 | RBG1 | RBG2 | RBG3 | RBG4 | RBG5 |
| Symbol 0 | o | o | o | o | o | o |
| Symbol 1 | o | o | o | o | o | o |
| Symbol 2 | x | x | x | x | x | x |
| Symbol 3 | x | x | x | x | x | x |
| Symbol 4 | x | x | x | x | x | x |
| Symbol 5 | x | x | x | x | x | x |
| Symbol 6 | x | x | x | x | x | x |
| Symbol 7 | x | x | x | x | x | x |
| Symbol 8 | x | x | x | x | x | x |
| Symbol 9 | x | x | x | x | x | x |
| Symbol 10 | x | x | x | x | x | x |
| Symbol 11 | x | x | x | x | x | x |
| Symbol 12 | x | x | x | x | x | x |
| Symbol 13 | o | o | o | o | o | o |

Table 8 is an example illustration of transmission (e.g., indicted by an "x") and non-transmission (e.g., indicated by an "o") resources based on a priority bit-map and a WTRU priority of 2 (001). As illustrated in Table 8, a WTRU may transmit on resources marked with an "x".

TABLE 8

| | Group 1 | | | Group 2 | | |
|---|---|---|---|---|---|---|
| | RBG0 | RBG1 | RBG2 | RBG3 | RBG4 | RBG5 |
| Symbol 0 | o | o | o | o | o | o |
| Symbol 1 | o | o | o | o | o | o |
| Symbol 2 | x | x | x | x | x | x |
| Symbol 3 | x | x | x | x | x | x |
| Symbol 4 | o | o | o | o | o | o |
| Symbol 5 | o | o | o | o | o | o |
| Symbol 6 | o | o | o | o | o | o |
| Symbol 7 | o | o | o | o | o | o |
| Symbol 8 | o | o | o | o | o | o |
| Symbol 9 | o | o | o | o | o | o |
| Symbol 10 | o | o | o | o | o | o |
| Symbol 11 | o | o | o | o | o | o |
| Symbol 12 | o | o | o | o | o | o |
| Symbol 13 | o | o | o | o | o | o |

Referring now to Tables 2 to 8, the signaling described herein may be combined with the SFI, which may reduce the overall signaling overhead.

A WTRU may combine the rules described herein (e.g., in conjunction with Tables 2 to 7) with a minimum size (e.g., a minimum number of OFDM symbols), which may prevent a scenario where the (e.g., only the) configured minimum size of symbols may be used in a repetition.

The number of symbols represented by an (e.g., each) entry in a priority map or a bit-map may be configurable or may be greater than one.

The early termination of repetitions may be provided for. One or more of the following may apply.

A gNB may signal an early termination of the repetitions to the WTRU. A repetition may be terminated early for one or more of the following scenarios: the gNB has successfully decoded the transmission and would like to allocate the rest of the resources to another WTRU; the gNB determines to reschedule the transmission of the current WTRU (e.g., due to a transmission with higher priority from the same WTRU or a different WTRU); and the gNB measures interference in the channel after transmission (e.g., using a CSI-IM resource) and determines that the transmission may not be successful (e.g., even with repetition).

A WTRU may monitor for an early termination signal from the gNB. The WTRU may be configured to monitor for the early termination signal at specified intervals, for example, using RRC signaling. The WTRU may be activated to monitor for the early termination signal using either a dedicated DCI or the DCI used to schedule the transmission. The early termination signaling may be performed by a PDCCH or a sequence. For example, early termination signaling may be performed by transmitting a certain sequence, which may be predefined or configured. The DCI may indicate whether the transmission may be terminated. The DCI may indicate one or more possible resources that the WTRU is to monitor for a termination signal. The DCI may indicate the reason for the termination (e.g., decoding success).

In a frequency domain duplexing (FDD) scenario, the WTRU may monitor for the early termination signal at defined intervals, for example, even while the WTRU may be transmitting. In a time domain duplexing (TDD) scenario, the WTRU may monitor for the early termination signal during DL symbols that may be found during the transmission. For example, a transmission may not be terminable if, in a TDD scenario, a DL signal during the repetitions does not exist.

In scenarios where the presence of DL/UL switching or non-transmission resources results in a transmission with a high overhead, a WTRU may perform one or more of the following. The WTRU may transmit the signal anyway. If the overhead is higher than a threshold, the WTRU may drop the transmission. For example, the threshold may be fixed (e.g., or static), RRC configured, or may be dynamically configured.

One or more of the following may be performed by a WTRU to perform early repetition termination.

A WTRU may receive a scheduling DCI that indicates multiple repetition/multiple segment transmissions. The DCI may include one or more of the following: an indication of the start and duration of 1st repetition and total number of nominal repetitions; one or more indices to an SFI table (e.g., a restricted SFI table, which may reduce overhead) to indicate DL/UL structure of slot in a dynamic TDD scenario; a resource avoidance mechanism with the associated signaling; or an indication of whether to monitor for an early termination signal and the associated configuration.

The DCI may include one or more indices to an SFI table to indicate a DL/UL structure of a slot, e.g., in a dynamic TDD scenario. One or more of the following may apply. If an (e.g., only a single) SFI is signaled, the SFI may be constant over the entire transmission (e.g., for additional slots). If an (e.g., only a single) SFI is signaled, the SFI may be associated with (e.g., only associated with) that slot and the WTRU may expect additional SFI transmissions in the future. If multiple SFIs are signaled, the slot structure for the entire multi-slot transmission may be indicated by the multiple SFIs. For example, the slot structure may not be overwritten by a subsequent SFI that has a different structure from the previous SFI. If no SFI is signaled, the existing SFI from a previous slot may be used by the WTRU. The WTRU may revert to a semi-static SFI, which may have been previously configured by the network (e.g., a gNB).

The DCI may include a resource avoidance mechanism and associated signaling. One or more of the following may apply. In examples, the resource avoidance mechanism and associated signaling may include a bit-map indicating the allowed and not allowed resources. In examples, the resource avoidance mechanism and associated signaling may include signaling that indicates the priority of the scheduled traffic and the priority of the different resources (e.g., using a resource priority bit-map, as described herein, for example).

The WTRU may construct the multiple transmissions using the defined rules and the associated signaling. One or more of the following may apply. The WTRU may estimate the DL/UL or flexible symbol structure for the current slot, for example, based on the SFI. The WTRU may read the signaling for the resources that the WTRU may transmit on within the resources indicated in the allocating DCI. For example, the resources that the WRTU may use for transmission may be indicated by one or more of the following: a resource priority map; a combination of the resource priority map and the SFI; or a resource transmission bit-map. The WTRU may perform rate matching around non-transmission resources. The WTRU may puncture the WTRU's data to avoid non-transmission resources.

The WTRU may monitor or receive for an early termination configuration (e.g., or an early termination signal).

The WTRU may transmit data. One or more of the following may apply. If the WTRU is configured for early termination, the WTRU may monitor for an early termination signal (e.g., in pre-defined resources). If the WTRU receives an early termination signal, the WTRU may stop transmission (e.g., even if the WTRU may be mid repetition). The WTRU may stop transmission at the point of reception of the early termination signal. The WTRU may stop transmission at a pre-defined (or signaled) number of retransmissions after receipt of the early termination signal.

A WTRU may perform PUSCH repetition using a dedicated SFI and a resource avoidance map. A WTRU may receive a slot format configuration (SFC) that indicates flexible symbols, uplink symbols, and downlink symbols. The WTRU may receive an uplink grant that may be associated with the PUSCH transmission with repetitions. The received uplink grant may comprise a dedicated slot format indicator (SFI) and a resource map that indicates available resource block groups associated with the uplink symbols. The WTRU may identify an available uplink symbol based on the SFC, the SFI, and the resource map. The WTRU may identify, for the available uplink symbol, unavailable resource block groups based on the resource map. The WTRU may perform a PUSCH transmission repetition using the available uplink symbol, wherein the PUSCH transmission avoids the unavailable resource block groups.

Figure 11:
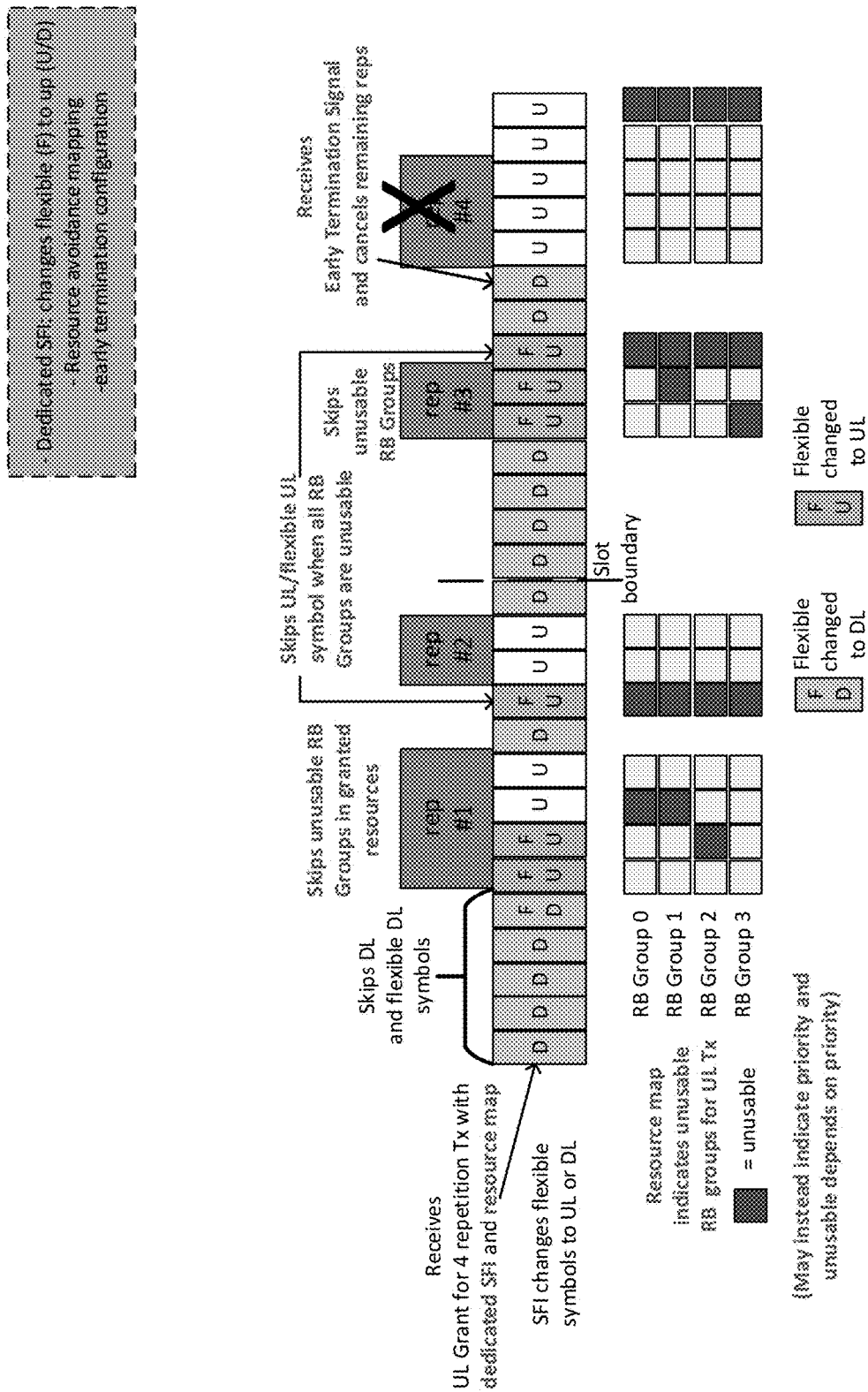

FIG. 11 illustrates an example implementation of URLLC PUSCH repetition. FIG. 11 illustrates an example SFI, (e.g. where the SFI may be transmitted at a reliability that satisfies (e.g., may be equal to) the reliability of the URLLC transmission), resource avoidance map, and early termination.

A WTRU may receive a symbol configuration where symbols indicated as UL may be used for URLLC PUSCH transmission with repetitions. The WTRU may receive an UL grant with a dedicated SFI for symbol reconfiguration and a resource map identifying unusable resources. The WTRU may determine symbols and resources within the symbols. The WTRU may use the determined symbols and resources within the symbols to transmit URLLC PUSCH repetitions. Such transmissions may avoid collisions.

The dedicated SFI may indicate a change for symbols (e.g., all symbols). The dedicated SFI may indicate a change for flexible symbols (e.g., for flexible symbols only). The dedicated SFI may indicate a change for flexible and/or uplink symbols (e.g., for flexible and uplink symbols only).

The size of the dedicated SFI may be derived, e.g., implicitly derived, from the SFI (e.g., semi-static SFI) that it may be modifying. The dedicated SFI may be a bitmap of the length of symbols that may be changed. For example, if there are 5 flexible symbols, then the dedicated SFI may be a bitmap of length 5 with each bit indicating if the corresponding flexible symbol is an uplink symbol.

The SFI may be given as [d d d d f f f u u d f u u d], where d refers to downlink, f to flexible, and u to uplink. A bitmap or an index into a 4-symbol bitmap may be used to indicate which of the four flexible symbols may be uplink. A bitmap or an index into a 4-symbol bitmap may be used to indicate which of the four flexible symbols may be uplink or downlink.

The dedicated SFI may be an index to a second RRC configured table (e.g., separate from the RRC configured table that may be used for the SFI transmission) that may indicate which of the flexible symbols is to be switched to uplink.

The SFI may be given as [d d d d f f f u u d f u u d], where there are 4 flexible symbols. An RRC configured table may be used. An RRC configured table may range in size (e.g., from 1 entry to 16 entries). An index into this table may be used to indicate which of the flexible symbols are uplink. The dedicated SFI field size may be configurable.

A resource map may indicate unusable resource block (RB) groups for UL transmission. A resource map may indicate the resource priority, and unusable resources may depend on the relationship between the resource priority and the priority of the data traffic to be sent. In examples, if the traffic priority is higher/lower than the resource priority, it may be sent/not sent on the resource. The WTRU may skip unusable RB groups (e.g., all unusable RB groups) in the granted resource. The WTRU may skip the entire resource (e.g., if the RB groups in an UL/flexible UL are unusable).

A WTRU may send a URLLC PUSCH transmission with repetitions. The WTRU may receive a slot format configuration (SFC) that indicates symbols as UL, DL, or flexible. The SFC may be based on an RRC configured or semi-static SFI. The WTRU may receive an UL grant (e.g., for PUSCH transmission) with repetitions, which may include a dedicated SFI and resource map that may indicate availability of RBG's in UL symbols. The WTRU may determine a set of consecutive symbols as available UL symbols based on the SFC, the SFI, and/or the resource map where an UL symbol is available if at least one RBG of the symbol is indicated as available. The WTRU may determine, for the set of consecutive available UL symbols, the RBG's that may be unavailable based on the resource map. The WTRU may transmit a PUSCH repetition in resources of the consecutive available UL symbols where the PUSCH repetition may not be transmitted in resources in the unavailable RBG's (e.g., rate, matching, or puncturing may be used). The WTRU may forego transmission of remaining repetitions if an early termination indication is received).

Accordingly, techniques have been disclosed for providing PUSCH transmissions with repetitions. The PUSCH transmissions may be used in connection with, for example, ultra-reliable low latency communications (URLLC). A WTRU receive a slot format configuration (SFC) that indicates flexible symbols, uplink symbols, and downlink symbols. The WTRU may receive an uplink grant that may be associated with the PUSCH transmission with repetitions. The received uplink grant may comprise a dedicated slot format indicator (SFI) and a resource map that indicates available resource block groups associated with the uplink symbols. The WTRU may identify an available uplink symbol based on the SFC, the SFI, and the resource map. An uplink symbol may be identified as available if at least one resource block group of the symbol may be indicated as available. The WTRU may identify, for the available uplink symbol, unavailable resource block groups based on the resource map. The WTRU may perform a PUSCH transmission repetition using the available uplink symbol, wherein the PUSCH transmission avoids the unavailable resource block groups. If the WTRU receives a termination indication, the WTRU may forego transmission of any remaining repetitions.

It will be appreciated that while illustrative implementations have been disclosed, the scope of potential implementations is not limited to those explicitly set out. For example, while systems have been described with reference to a particular criteria or conditions, the envisioned implementations extend beyond implementations using the particular criteria or conditions. Although the solutions described herein consider certain technologies (e.g., New Radio (NR), 5G or LTE, LTE-A specific protocols), the techniques described herein may not be restricted to any technology and may be applicable to any systems. Although the features and elements may be described herein in particular combinations, each feature or element may be used alone, without the other features and elements, and/or in various combinations with or without other features and elements.

It is understood that the entities performing the processes described herein may be logical entities that may be implemented in the form of software (i.e., computer-executable instructions) stored in a memory of, and executing on a processor of, a mobile device, network node or computer system. That is, the operation(s) may be implemented in the form of software (i.e., computer-executable instructions) stored in a memory of a mobile device and/or network node, such as the node or computer system, which computer executable instructions, when executed by a processor of the node, perform the processes discussed. It is also understood that any transmitting and receiving processes illustrated in FIGS. may be performed by communication circuitry of the node under control of the processor of the node and the computer-executable instructions (e.g., software) that it executes.

The various techniques described herein may be implemented in connection with hardware or software or, where appropriate, with a combination of both. Thus, the implementations and apparatus of the subject matter described herein, or certain aspects or portions thereof, may take the form of program code (i.e., instructions) embodied in tangible media, such as flash drives, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable devices, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs may be implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computing systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

In describing illustrative implementations of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. Details described herein are intended to be exemplary and in no way limit the scope of the application.

Although features and elements are described herein in particular combinations, one of ordinary skill in the art will appreciate that each feature or element can be used alone or in any combination with the other features and elements, or in any combination with or without other features and elements. In addition, the implementations described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit and receive unit (WTRU) comprising:
   a processor configured at least to:
   receive information indicating:
      slot format configuration (SFC) information that indicates flexible symbols, uplink symbols, and downlink symbols,
      an uplink grant that is associated with a physical uplink shared channel (PUSCH) transmission,
      a slot format indicator (SFI), and
      a resource indication that indicates available resource block groups associated with the uplink symbols;
   identify, based on the SFC information and the SFI, an available uplink symbol;
   identify, based on the resource indication, the available uplink symbol is associated with at least one available resource block group; and
   send the PUSCH transmission using the available uplink symbol.

2. The WTRU of claim 1,
   wherein the resource indication indicates a resource priority, and
   wherein the processor is further configured to identify, for the available uplink symbol, available resource block groups to send the PUSCH transmission by comparing the resource priority and a priority associated with data to be sent in the PUSCH transmission.

3. The WTRU of claim 1, wherein the SFI indicates flexible symbols that are available for uplink.

4. The WTRU of claim 3, wherein the SFI comprises a information indicating flexible symbols in a plurality of symbols, the flexible symbols available for uplink.

5. The WTRU of claim 3, wherein the SFI comprises an index to a table, the table identifying flexible symbols available for uplink.

6. The WTRU of claim 1,
   wherein the processor configured to identify the available uplink symbol is further configured to
   identify, based on the SFI, a flexible symbol available for uplink; and
   wherein the processor configured to identify the available uplink symbol is associated with at least one available resource block group is further configured to identify, based on the resource indication, the flexible symbol available for uplink is associated with at least one available resource block group.

7. The WTRU of claim 1, wherein the processor configured to send the PUSCH transmission is configured to perform a PUSCH transmission repetition.

8. The WTRU of claim 7, wherein the processor is further configured to:
   receive an indication of a termination; and
   terminate the PUSCH transmission repetition.

9. A method for use in a wireless transmit and receive unit (WRTU) comprising:
   the WTRU receiving information indicating:
      slot format configuration (SFC) information that indicates flexible symbols, uplink symbols, and downlink symbols,
      an uplink grant that is associated with a physical uplink shared channel (PUSCH) transmission,
      a slot format indicator (SFI), and
      a resource indication that indicates available resource block groups associated with the uplink symbols;
   the WTRU identifying, based on the SFC and the SFI, an available uplink symbol,
   the WTRU identifying, based on the resource indication, the available uplink symbol is associated with at least one available resource block group;
   and
   the WTRU sending the PUSCH transmission using the available uplink symbol.

10. The method of claim 9,
    wherein the resource indication indicates a resource priority, and
    wherein the method further comprises identifying, for the available uplink symbol, available resource block groups to send the PUSCH transmission by comparing the resource priority and a priority associated with data to be sent in the PUSCH transmission.

11. The method of claim 9, wherein the SFI indicates flexible symbols that are available for uplink.

12. The method of claim 11, wherein the SFI comprises information indicating flexible symbols in a plurality of symbols, the flexible symbols available for uplink.

13. The method of claim 9,
wherein identifying the available uplink symbol comprises identifying, based on the SFI, a flexible symbol available for uplink; and
wherein identifying the available uplink symbol is associated with at least one available resource block group comprises identifying, based on the resource indication, the flexible symbol available for uplink is associated with at least one available resource block group.

14. The method of claim 9, wherein sending the PUSCH transmission comprises performing a plurality of PUSCH transmission repetitions.

15. The method of claim 14, further comprising:
receiving an indication of a termination; and
terminating performing the plurality of PUSCH transmission repetitions.

16. A wireless transmit and receive unit (WTRU) comprising:
a processor configured at least to:
receive information indicating:
an uplink grant that is associated with a physical uplink shared channel (PUSCH) transmission,
a slot format indicator (SFI), and
a resource indication that indicates available resource block groups associated with uplink symbols;
identify, based on the SFI, an available uplink symbol;
identify, based on the resource indication, the available uplink symbol is associated with at least one available resource block group;
and
send the PUSCH transmission using the available uplink symbol.

17. The WTRU of claim 16, wherein the SFI indicates flexible symbols that are available for uplink.

18. The WTRU of claim 17, wherein the SFI comprises information indicating flexible symbols in a plurality of symbols, the flexible symbols available for uplink.

19. The WTRU of claim 16,
wherein the processor configured to identify the available uplink symbol is further configured to identify, based on the SFI, a flexible symbol available for uplink; and
wherein the processor configured to identify the available uplink symbol is associated with at least one available resource block group is further configured to identify, based on the resource indication, the flexible symbol available for uplink is associated with at least one available resource block group.

20. The WTRU of claim 16, wherein the processor configured to send the PUSCH transmission is configured to perform a PUSCH transmission repetition.

* * * * *